United States Patent
Sarferaz

(10) Patent No.: US 11,880,740 B2
(45) Date of Patent: Jan. 23, 2024

(54) FACILITATING MACHINE LEARNING CONFIGURATION

(71) Applicant: SAP SE, Walldorf (DE)

(72) Inventor: Siar Sarferaz, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/096,421

(22) Filed: Jan. 12, 2023

(65) Prior Publication Data

US 2023/0148337 A1     May 11, 2023

Related U.S. Application Data

(62) Division of application No. 16/837,518, filed on Apr. 1, 2020, now Pat. No. 11,580,455.

(51) Int. Cl.
*G06N 20/00* (2019.01)
*G06F 16/28* (2019.01)

(52) U.S. Cl.
CPC .......... *G06N 20/00* (2019.01); *G06F 16/284* (2019.01)

(58) Field of Classification Search
CPC ...... G06N 20/00; G06N 5/025; G06F 16/284; G06Q 10/067; G06Q 30/0201; G06Q 30/0202; H04L 67/10; H04L 67/303; H04L 51/02; H04L 67/16; H04L 67/12
See application file for complete search history.

(56) References Cited

U.S. PATENT DOCUMENTS

| | | | |
|---|---|---|---|
| 4,969,097 A | 11/1990 | Levin | |
| 5,724,457 A | 3/1998 | Fukushima | |
| 5,805,159 A | 9/1998 | Bertram et al. | |
| 5,864,340 A | 1/1999 | Bertram et al. | |
| 5,959,629 A | 9/1999 | Masui | |
| 6,002,390 A | 12/1999 | Masui | |

(Continued)

FOREIGN PATENT DOCUMENTS

| | | |
|---|---|---|
| EP | 3422262 | 1/2019 |
| EP | 3483797 | 5/2019 |

(Continued)

OTHER PUBLICATIONS

"Model Tuning," retrieved from https://www.datarobot.com/wiki/tuning/, at least as early as Mar. 31, 2020, 1 page.

(Continued)

*Primary Examiner* — El Hadji M Sall
(74) *Attorney, Agent, or Firm* — Klarquist Sparkman, LLP

(57) ABSTRACT

Techniques and solutions are described for facilitating the use of machine learning techniques. In some cases, filters can be defined for multiple segments of a training data set. Model segments corresponding to respective segments can be trained using an appropriate subset of the training data set. When a request for a machine learning result is made, filter criteria for the request can be determined and an appropriate model segment can be selected and used for processing the request. One or more hyperparameter values can be defined for a machine learning scenario. When a machine learning scenario is selected for execution, the one or more hyperparameter values for the machine learning scenario can be used to configure a machine learning algorithm used by the machine learning scenario.

20 Claims, 18 Drawing Sheets

(56) References Cited

U.S. PATENT DOCUMENTS

| | | | |
|---|---|---|---|
| 6,321,158 | B1 | 11/2001 | DeLorne et al. |
| 6,337,698 | B1 | 1/2002 | Keely, Jr. et al. |
| 6,678,169 | B2 | 1/2004 | Bennett et al. |
| 7,171,353 | B2 | 1/2007 | Tower, II et al. |
| 7,194,404 | B1 | 3/2007 | Babst et al. |
| 7,387,457 | B2 | 6/2008 | Jawerth et al. |
| 7,447,627 | B2 | 11/2008 | Jessee et al. |
| 7,689,684 | B2 | 3/2010 | Donoho et al. |
| 8,015,482 | B2 | 9/2011 | Simova et al. |
| 8,356,046 | B2 | 1/2013 | Hille-Doering et al. |
| 8,396,582 | B2 | 3/2013 | Kaushal et al. |
| 8,856,676 | B1 | 10/2014 | Starenky et al. |
| 9,058,317 | B1 | 6/2015 | Gardner et al. |
| 9,449,344 | B2 | 9/2016 | Deshpande et al. |
| 9,934,203 | B2 | 4/2018 | Bahgat et al. |
| 10,034,645 | B1 | 7/2018 | Williams |
| 10,482,389 | B2 | 11/2019 | Qin et al. |
| 10,706,046 | B2 | 7/2020 | Werner et al. |
| 10,719,301 | B1 | 7/2020 | Dasgupta et al. |
| 10,963,734 | B1 | 3/2021 | Wang et al. |
| 11,003,992 | B2 | 5/2021 | Wesolowski et al. |
| 11,030,485 | B2 | 6/2021 | Karam et al. |
| 11,232,506 | B1 | 1/2022 | Zielnicki |
| 11,288,240 | B1 | 3/2022 | Sayad et al. |
| 11,341,367 | B1 * | 5/2022 | Barbosa ............. G06F 18/2148 |
| 2002/0015042 | A1 | 2/2002 | Robotham et al. |
| 2002/0024506 | A1 | 2/2002 | Flack et al. |
| 2002/0052900 | A1 | 5/2002 | Freeman |
| 2002/0156864 | A1 | 10/2002 | Kniest |
| 2003/0212544 | A1 | 11/2003 | Acero et al. |
| 2004/0239681 | A1 | 12/2004 | Robotham et al. |
| 2005/0012723 | A1 | 1/2005 | Pallakoff |
| 2005/0195221 | A1 | 9/2005 | Berger et al. |
| 2005/0223308 | A1 | 10/2005 | Gunn et al. |
| 2005/0283364 | A1 | 12/2005 | Longe et al. |
| 2006/0020904 | A1 | 1/2006 | Aaltonen et al. |
| 2006/0026521 | A1 | 2/2006 | Hetelling et al. |
| 2006/0026535 | A1 | 2/2006 | Hotelling et al. |
| 2006/0026536 | A1 | 2/2006 | Hotelling et al. |
| 2006/0088356 | A1 | 4/2006 | Jawerth et al. |
| 2006/0095842 | A1 | 5/2006 | Lehto |
| 2006/0101005 | A1 | 5/2006 | Yang et al. |
| 2006/0161870 | A1 | 7/2006 | Hotelling et al. |
| 2006/0161871 | A1 | 7/2006 | Hotelling et al. |
| 2006/0265648 | A1 | 11/2006 | Rainisto et al. |
| 2006/0274051 | A1 | 12/2006 | Longe et al. |
| 2007/0061701 | A1 | 3/2007 | Thieberger et al. |
| 2007/0061704 | A1 | 3/2007 | Smiova et al. |
| 2007/0263007 | A1 | 11/2007 | Robotham |
| 2013/0212103 | A1 | 8/2013 | Cao et al. |
| 2014/0040286 | A1 | 2/2014 | Bane et al. |
| 2015/0127343 | A1 | 5/2015 | Mullor et al. |
| 2015/0242760 | A1 | 8/2015 | Miao et al. |
| 2015/0379428 | A1 * | 12/2015 | Dirac ................. G06N 20/00 706/12 |
| 2015/0379429 | A1 | 12/2015 | Lee et al. |
| 2015/0379430 | A1 * | 12/2015 | Dirac ................. G06N 20/00 706/12 |
| 2016/0055010 | A1 | 2/2016 | Baird et al. |
| 2016/0078361 | A1 * | 3/2016 | Brueckner ............ H04L 67/10 706/12 |
| 2016/0092786 | A1 | 3/2016 | Mehanna et al. |
| 2016/0228261 | A1 | 8/2016 | Emery et al. |
| 2017/0060356 | A1 | 3/2017 | Oota et al. |
| 2017/0185242 | A1 | 6/2017 | Jann et al. |
| 2017/0243133 | A1 | 8/2017 | Zavesky |
| 2017/0329466 | A1 | 11/2017 | Krenkler et al. |
| 2018/0136332 | A1 | 5/2018 | Barfield, Jr. et al. |
| 2018/0157987 | A1 | 6/2018 | Schmidt-Karaca |
| 2018/0165599 | A1 | 6/2018 | Pete et al. |
| 2018/0285777 | A1 | 10/2018 | Li et al. |
| 2018/0332082 | A1 | 11/2018 | Baumgart et al. |
| 2018/0349795 | A1 | 12/2018 | Boyle et al. |
| 2019/0026648 | A1 | 1/2019 | Da et al. |
| 2019/0068365 | A1 | 2/2019 | Wright et al. |
| 2019/0073293 | A1 | 3/2019 | Sarferaz et al. |
| 2019/0080347 | A1 | 3/2019 | Smith |
| 2019/0147361 | A1 | 5/2019 | Matsumoto et al. |
| 2019/0156216 | A1 | 5/2019 | Gupta et al. |
| 2019/0188251 | A1 | 6/2019 | Liu et al. |
| 2019/0209022 | A1 * | 7/2019 | Sobol ................. A61B 5/0022 |
| 2019/0272479 | A1 | 9/2019 | Mars et al. |
| 2019/0318099 | A1 | 10/2019 | Carvalho et al. |
| 2019/0325333 | A1 | 10/2019 | Chan et al. |
| 2019/0332895 | A1 | 10/2019 | Anghel et al. |
| 2019/0370684 | A1 | 12/2019 | Gunes et al. |
| 2019/0370687 | A1 | 12/2019 | Pezzillo et al. |
| 2019/0370731 | A1 * | 12/2019 | Mota Manhaes ...... G06N 5/045 |
| 2019/0391956 | A1 | 12/2019 | Kozhaya et al. |
| 2019/0392345 | A1 | 12/2019 | Adaska et al. |
| 2020/0153701 | A1 | 5/2020 | Mohan et al. |
| 2020/0184380 | A1 | 6/2020 | Thomas et al. |
| 2020/0210696 | A1 | 7/2020 | Hou et al. |
| 2020/0210769 | A1 | 7/2020 | Hou et al. |
| 2020/0285939 | A1 | 9/2020 | Baker |
| 2020/0311573 | A1 | 10/2020 | Desai et al. |
| 2020/0372395 | A1 | 11/2020 | Mahmud et al. |
| 2020/0380155 | A1 | 12/2020 | Sarferaz |
| 2020/0380399 | A1 | 12/2020 | Weider et al. |
| 2020/0401931 | A1 | 12/2020 | Duan et al. |
| 2021/0004712 | A1 | 1/2021 | Sarferaz et al. |
| 2021/0042290 | A1 | 2/2021 | Banipal et al. |
| 2021/0042657 | A1 | 2/2021 | Tiruveedhula |
| 2021/0056164 | A1 | 2/2021 | Mustafi et al. |
| 2021/0073627 | A1 | 3/2021 | Sarferaz et al. |
| 2021/0081848 | A1 | 3/2021 | Polleri et al. |
| 2021/0117775 | A1 | 4/2021 | Ziotnick |
| 2021/0133612 | A1 | 5/2021 | Sinha et al. |
| 2021/0182698 | A1 | 6/2021 | Biannic et al. |
| 2021/0192283 | A1 | 6/2021 | Guo et al. |
| 2021/0192376 | A1 | 6/2021 | Sarferaz et al. |
| 2021/0209501 | A1 | 7/2021 | Sarferaz et al. |
| 2021/0216904 | A1 | 7/2021 | Khurana et al. |
| 2021/0216912 | A1 | 7/2021 | Hasse-Scheutz et al. |
| 2021/0241168 | A1 | 8/2021 | Sarferaz et al. |
| 2021/0264312 | A1 | 8/2021 | Sarferaz et al. |
| 2021/0312317 | A1 | 10/2021 | Sarferaz |
| 2021/0342738 | A1 | 11/2021 | Sarferaz et al. |
| 2022/0050695 | A1 | 2/2022 | Gajendran et al. |
| 2022/0327693 | A1 | 10/2022 | Kim |

FOREIGN PATENT DOCUMENTS

| | | |
|---|---|---|
| EP | 3843017 | 6/2021 |
| WO | WO 2009047561 | 4/2009 |
| WO | WO 2015067087 | 5/2015 |
| WO | WO 2018017467 | 1/2018 |
| WO | WO 2018217903 | 11/2018 |
| WO | WO 2009047561 | 4/2019 |
| WO | WO 2021050391 | 3/2021 |

OTHER PUBLICATIONS

"Data Robot," retrieved from https://www.datarobot.com/wp-content/uploads/2019/09/DataRobot_DataRobotAutomatedMachineLearningPlatform_Datasheet_USA_09-03-2019.pdf, at least as early as Mar. 31, 2020, 2 pages.
Ben-Hur et al., "A User's Guide to Support Vector Machines," http://pyml.sourceforge.net/doc/howto.pdf, at least as early as May 1, 2020, 18 pages.
Jain, "Simple Tutorial on SVM and Parameter Tuning in Python and R," https://www.hackerearth.com/blog/developers/simple-tutorial-svm-parameter-tuning-python-r/, Feb. 21, 2017, 10 pages.
"Types of Machine Learning Algorithms You Should Know," https://towardsdatascience.com/types-of-machine-learning-algorithms-you-should-know-953a08248861?gi=1228b51fc8a3, Jun. 15, 2017, 8 pages.
Interpreting random forests, https://blog.datadive.net/interpreting-random-forests/, Oct. 1, 2014, 16 pages.
Sidana, "Intro to types of classification algorithms in Machine Learning," https://medium.com/sifium/machine-learning-types-of-classification-9497bd4f2e14, Feb. 28, 2017, 5 pages.

(56) References Cited

OTHER PUBLICATIONS

Applying Multinomial Naïve Bayes to NLP Problems: A Practical Explanation, https://medium.com/syncedreview/applying-multinomial-naive-bayes-to-nlp-problems-a-practical-explanation-4f5271768ebf, Jul. 17, 2017, 9 pages.
Ray, "6 Easy Steps to Learn Naïve Bayes Algorithm with codes in Python and R," https://www.analyticsvidhya.com/blog/2017/09/naive-bayes-explained/, Sep. 11, 2017, 26 pages.
Naïve Bayes classifier for multinomial models, https://scikit-learn.org/stable/modules/generated/sklearn.naive_bayes.MultinomialNB.html#sklearn.naive_bayes.MultinomialNB, at least as early as May 1, 2020, 5 pages.
Lundberg et al., "Consistent Individualized Feature Attribution for Tree Ensembles," https://arxiv.org/pdf/1802.03888.pdf, Mar. 7, 2019, 9 pages.
Simpson's paradox, Wikipedia, https://en.wikipedia.org/wiki/Simpson%27s_paradox, at least as early as May 1, 2020, 6 pages.
Strings as features in decision tree/random forest, machine learning—strings as features in decision tree/random forest—Data Science Stack Exchange, at least as early as May 1, 2020, 6 pages.
Mutual information, Wikipedia, https://en.wikipedia.org/wiki/Mutual_information, at least as early as May 1, 2020, 10 pages.
Kratzer et al., "varrank: An R Package for Variable Ranking Based on Mutual Information with Applications to Systems Epidemiology," https://www.math.uzh.ch/pages/varrank/articles/varrank.html, Jan. 29, 2020, 27 pages.
Ribeiro et al., "Why Should I Trust You?" Explaining the Predictions of Any Classifier, https://arxiv.org/pdf/1602.04938.pdf, Aug. 9, 2016, 10 pages.
Basic classification: Classify images of clothing, https://www.tensorflow.org/tutorials/keras/classification, at least as early as May 1, 2020, 17 pages.
Nishida, "Finding Variable Importance with Random Forest & Boruta," https://blog.exploratory.io/finding-variable-importance-with-random-forest-boruta-28badd116197?gi=8b6a24a3a90a, Sep. 27, 2019, 9 pages.
Brownlee, "Linear Regression for Machine Learning," https://machinelearningmastery.com/linear-regression-for-machine-learning/, Mar. 25, 2016, 28 pages.
Cross-validation(statistics), Wikipedia, https://en.wikipedia.org/wiki/Cross-validation_(statistics), at least as early as May 1, 2020, 12 pages.
Brownlee, "What is the Difference Between a Parameter and a Hyperparameter?" https://machinelearningmastery.com/difference-between-a-parameter-and-a-hyperparameter/, Jul. 26, 2017, 29 pages.
Parkinson, "SAP Data Intelligence: Create your first AutoML Scenario," https://blogs.sap.com/2019/12/18/sap-data-intelligence-create-your-first-automl-scenario/, Dec. 18, 2019, 16 pages.
"Input Field," retrieved from: https://experience.sap.com/fiori-design-web/input-field/, Feb. 4, 2019, 29 pages.
Master Data or Configuration Data, https://answers.sap.com/questions/10730590/master-data-or-configuration-data.html, Mar. 5, 2014, 3 pages.
Displaying/Changing Configuration Data, https://help.sap.com/doc/saphelp_nwpi71/7.1/en-US/89/b5553bf3a76258e10000000a114084/content.htm?no_cache=true, at least as early as Apr. 1, 2020, 4 pages.
SAP Configuration Data, https://www2.slideshare.net/ajaykumaruppal/sap-configuration-data, ,at least as early as Apr. 1, 2020, 13 pages.
Model Parameters and Hyperparameters in Machine Learning—What is the difference? https://towardsdatascience.com/model-parameters-and-hyperparameters-in-machine-learning-what-is-the-difference-702d30970f6, Oct. 20, 2019, 7 pages.
Gradient descent, Wikipedia, https://en.wikipedia.org/wiki/Gradient_descent, at least as early as Apr. 1, 2020, 6 pages.
Cullen, PAi Series Blog 3: Training and Activating the out of the box predictive content shipped by S/4HANA, https://blogs.sap.com/2019/02/07/pai-series-blog-3-training-and-activating-the-out-of-the-box-predictive-content-shipped-by-s4hana/, Feb. 7, 2019, 25 pages.
Extended European Search Report received in related European Patent Application No. 20215206.2, dated Jun. 18, 2021, 11 pages.
Scholbeck et al., "Sampling Intervention, Prediction, Aggregation: A Generalized Framework for Model-Agnostic Interpretations," arxiv.org, Cornell University Library, 201 Olin Library Cornell University, Ithaca, NY, Apr. 8, 2019, 12 pages.
Extended European Search Report received in related European Patent Application No. 20213362.5, dated May 21, 2021, 13 pages.
Cohen et al., "Feature Selection Based on the Shapley Value," IJCAI '05: Proceedings of the 19$^{th}$ International Joint Conference on Artificial Intelligence, Jul. 1, 2005, pp. 665-670.
Lin Chin-Fang, "Application-grounded evaluation of predictive model explanation methods," Master Thesis—Department of Mathematics and Computer Science Data Mining Research Group, Sep. 24, 2018, pp. 1-57. Retrieved from the Internet: https://pure.tue.nl/ws/portalfiles/portal/109407025/CSE667_master_thesis_C_Lin_final_version.pdf.
Messalas Andreas et al., "Model-Agnostic Interpretability with Shapley Values," 2019 10$^{th}$ International Conference on Informational Intelligence, Systems and Applications, (IISA), IEEE, Jul. 15, 2019, pp. 1-7.
Restriction Requirement received in U.S. Appl. No. 16/837,518, dated May 24, 2022, 6 pages.
Gong et al., "Diversity in Machine Learning," IEEE Access, vol. 7, May 17, 2019, pp. 64323-64350.
Non-Final Office Action received in U.S. Appl. No. 16/797,835, dated May 10, 2022, 50 pages.
Notice of Allowance received in U.S. Appl. No. 16/837,518, dated Jul. 28, 2022, 18 pages.
Final Office Action received in U.S. Appl. No. 16/797,835, dated Aug. 10, 2022, 26 pages.
Non-Final Office Action received in U.S. Appl. No. 16/725,734, dated Sep. 9, 2022, 25 pages.
Non-Final Office Action received in U.S. Appl. No. 16/865,021, dated Oct. 6, 2022, 24 pages.
Non-Final Office Action received in U.S. Appl. No. 16/47,018, dated Jan. 4, 2022, 26 pages.
Notice of Allowance received in U.S. Appl. No. 16/427,018, dated Jul. 21, 2022, 8 pages.
Non-Final OA received in U.S. Appl. No. 16/567,695, filed Jul. 27, 2022, 8 pages.
Notice of Allowance received in U.S. Appl. No. 16/735,089, dated Jul. 26, 2022, 10 pages.
Non-Final Office Action received in U.S. Appl. No. 16/782,512, dated Jun. 22, 2022, 30 pages.
Notice of Allowance received in U.S. Appl. No. 16/387,518, dated Nov. 15, 2022, 14 pages.
Final Office Action received in U.S. Appl. No. 16/725,734, dated Dec. 30, 2022, 19 pages.

* cited by examiner

```
@AbapCatalog.sqlViewName: 'Z_SEPM_SDDL_SOI'
define view z_sepm_sddl_salesorder_item as select    510
from snwd_so_i                              ↙
    association [1]      to sepm_sddl_salesorder_items1  as schedule_line            on $projection.item_key
  = schedule_line.sales_order.item_key
    association [0..1] to sepm_sddl_text_original_langu  as original_note_language   on $projection.note_key
  = original_note_language.text_original_language_key
    association [0..*] to sepm_sddl_text_data            as note_texts               on $projection.note_key
  = note_texts.original_lanuage_key
    association [1]      to sepm_sddl_product            as product                  on $projection.product_key
  = product.product_key
    association [1]      to sepm_sddl_salesorder_head    as sales_order              on $projection.sales_order_key
  = sales_order.sales_order_key
    association [0..1] to sepm_sddl_goods_issue_item     as goods_issue_item         on $projection.item_key
  = goods_issue_item.item_key
    association [1]      to tcurc                        as currency                 on currency_code
  = waers
{
    key bintohex (node_key) as item_key,
    parent_key              as sales_order_key,
    so_item_pos             as item_position,
    product_guid            as product_key,
    note_guid               as note_key,
    op_item_pos             as sales_opportunity_item_pos,
    @Semantics.currencyCode currency_code,
    @Semantics.amount.currencyCode: 'CURRENCY_CODE' gross_amount,
    @Semantics.amount.currencyCode: 'CURRENCY_CODE' net_amount,      514
    @Semantics.amount.currencyCode: 'CURRENCY_CODE' tax_amount,    ↙
    sales_order_region,     // can be used for model segmentation
    sales_order_type,       // can be used for model segmentation  516
    item_atp_status,                                              ↙
    schedule_line,          // association
    original_note_language, // association
    note_texts,             // association
    product,                // association
    sales_order,            // association
    goods_issue_item,       // association
    currency                // association
}
```

FIG. 5

FACILITATING MACHINE LEARNING CONFIGURATION

CROSS REFERENCE TO RELATED APPLICATIONS

This is a divisional application of U.S. patent application Ser. No. 16/837,518, filed Apr. 1, 2020, which is hereby incorporated herein by reference.

FIELD

The present disclosure generally relates to machine learning techniques. Particular implementations relate to configuring machine learning algorithms for particular use cases.

BACKGROUND

Machine learning is increasingly being used to make, or help make, various decisions, or to otherwise analyze data. Machine learning techniques can be used to analyze data more quickly or accurately than could be performed by a human. In some cases, it can be impracticable for humans to manually analyze a data set. Thus, machine learning has facilitated the rise of "big data," by providing ways that such data can be put to practical use.

However, even for experts in the field, machine learning can be complicated to understand, including configuring or managing machine learning models, such as determining when a model should be updated or retrained. The situation can be even more complex when machine learning is applied to particular applications in particular fields. That is, a computer scientist may understand the algorithms used in a machine learning technique, but may not understand the subject matter domain well enough to ensure that a model is accurately trained or to properly evaluate results provided by machine learning. Conversely, a domain expert may be well versed in a given subject matter area, but may not understand how the machine learning algorithms work.

Software companies have attempted to address these issues by providing pre-configured machine learning scenarios for particular solutions. However, among other things, the accuracy of these "out of the box" solutions can be suboptimal, since they may not be optimized for particular use cases. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating the use of machine learning techniques. In some cases, filters can be defined for multiple segments of a training data set. Model segments corresponding to respective segments can be trained using an appropriate subset of the training data set. When a request for a machine learning result is made, filter criteria for the request can be determined and an appropriate model segment can be selected and used for processing the request. One or more hyperparameter values can be defined for a machine learning scenario. When a machine learning scenario is selected for execution, the one or more hyperparameter values for the machine learning scenario can be used to configure a machine learning algorithm used by the machine learning scenario.

In one aspect, a method is provided for training multiple machine learning model segments and routing a machine learning request to an appropriate model segments. A selection of at least a first filter type is received. The selection can be, for instance, user input provided by a key user through a configuration user interface. The at least the first filter is applied to a first training data set to produce a first filtered training data set.

A machine learning algorithm is trained with the first filtered training data set to provide a first model segment. The machine learning algorithm is trained with at least a portion of the first training data set to provide a second model segment. The at least the portion of the first training data set is different than the first filtered training data set.

A request is received for a machine learning result, such as from an end user application, which can be received through an API. It is determined that the request includes at least a first filter value. Based at least in part on the at least the first filter value, the first model segment or the segment model segment is selected to provide a selected model segment. A machine learning result is generated using the selected model segment. The machine learning result is returned in response to the request.

In another aspect, a method is provided for configuring a machine learning model using one or more hyperparameters. The configuration can be carried out for use in training a machine learning model, or can be used in generating a machine learning result using a trained model. User input is received specifying a first value for a first hyperparameter of a machine learning algorithm. The first value is stored in association with a first machine learning scenario. A first request is received for a machine learning result using the first machine learning scenario. The first value is retrieved. The first machine learning algorithm is configured with the first value. A machine learning result is generated using the machine learning algorithm configured with the first value.

In a further aspect, a method is provided for processing a request for a machine learning result. A request for a machine learning result is received. A machine learning scenario associated with the request is determined. At least one value is determined for at least one hyperparameter for a machine learning algorithm associated with the machine learning scenario. The machine learning algorithm is configured with the at least one value. At least one filter value specified in the request is determined. A model segment of a plurality of model segments useable in processing the request is determined, based at least in part on the at least one filter value. A machine learning result is generated using the model segment configured with the at least one filer value.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 5 is an example virtual data model definition of a view that includes a specification of machine learning model segments.

DETAILED DESCRIPTION

Example 1—Overview

Figure 1:
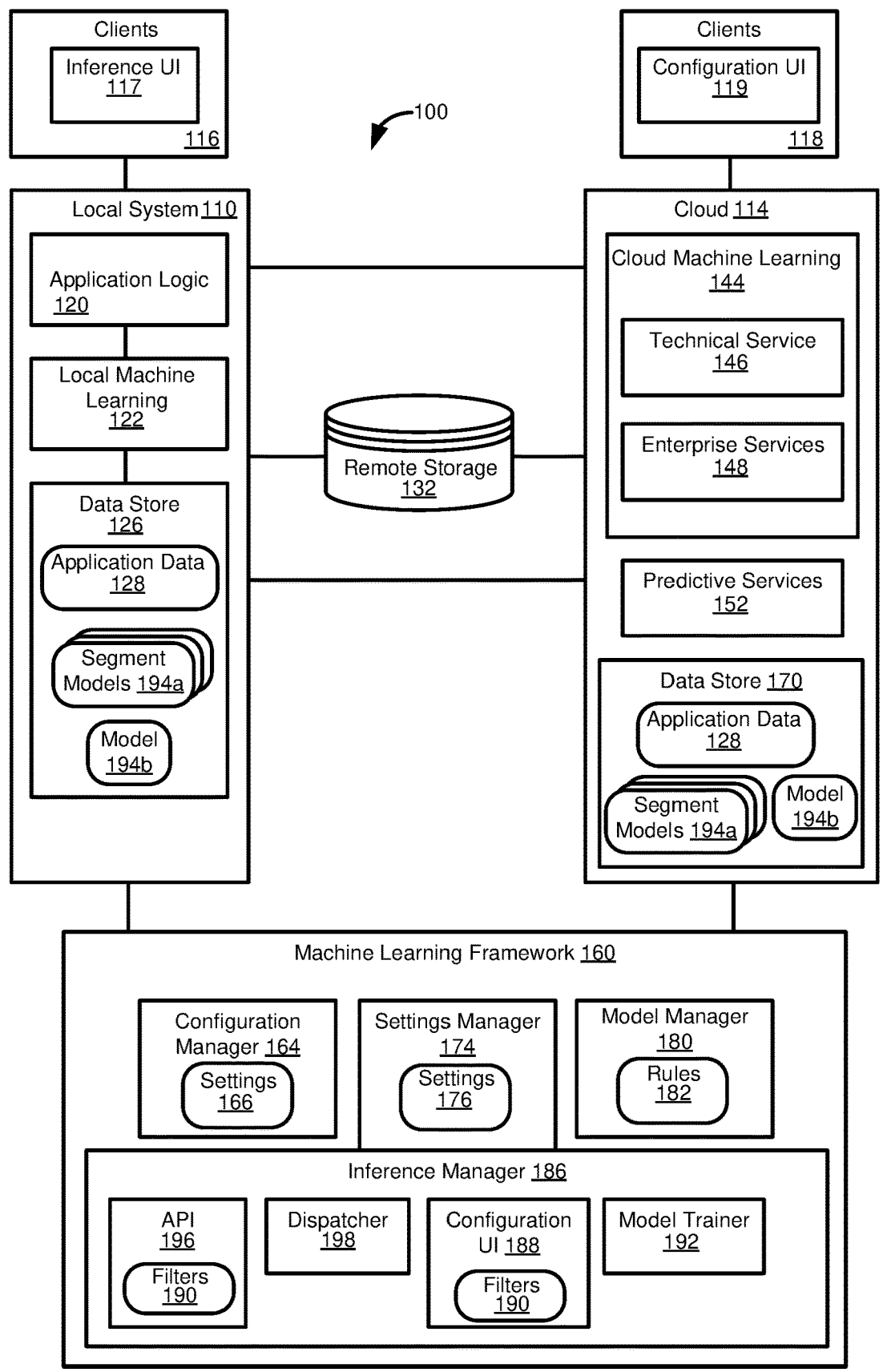
FIG. 1 is a diagram of a computing architecture having a local system and a cloud system, where each system can provide machine learning functionality.

Machine learning is increasingly being used to make, or help make, various decisions, or to otherwise analyze data. Machine learning techniques can be used to analyze data more quickly or accurately than could be performed by a human. In some cases, it can be impracticable for humans to manually analyze a data set. Thus, machine learning has facilitated the rise of "big data," by providing ways that such data can be put to practical use.

However, even for experts in the field, machine learning can be complicated to understand, including configuring or managing machine learning models, such as determining when a model should be updated or retrained. The situation can be even more complex when machine learning is applied to particular applications in particular fields. That is, a computer scientist may understand the algorithms used in a machine learning technique, but may not understand the subject matter domain well enough to ensure that a model is accurately trained or to properly evaluate results provided by machine learning. Conversely, a domain expert may be well versed in a given subject matter area, but may not understand how the machine learning algorithms work.

Software companies have attempted to address these issues by providing pre-configured machine learning scenarios for particular solutions. However, among other things, the accuracy of these "out of the box" solutions can be suboptimal, since they may not be optimized for particular use cases. Accordingly, room for improvement exists.

The present disclosure provides technologies for customizing machine learning solutions. In one aspect, the present disclosure provides technologies for developing a plurality of machine learning models for different use cases for a particular data set. As an example, a pre-configured, or "out of the box," machine learning solution may train a machine learning model using a particular data set, but a user may wish to obtain results for input that represents a different data set, which in some cases can be a subset of the type of data used to train a machine learning model. Consider the example of sales data and sales forecasting. If a machine learning model was trained using data for global sales, a request to obtain a result (or inference) for a particular region, such as a particular continent, country, or state, may lead to less accurate results than could be achieved using a model trained with a subset of data that be more relevant to the inference request. Consider a forecast for sales of cars with manual transmissions, if a model were trained using data from countries where manual transmissions are common, such as European countries, a request for a forecast of sales for cars having manual transmissions within the United States, where such cars are much less common, could be quite inaccurate.

Accordingly, disclosed technologies allow different model segments to be created for a machine learning scenario, including based on a single training data set. A key user (e.g., a user having sufficient knowledge to configure machine learning scenarios for use by end users) can define criteria, such as filters, that segment a training data set into one or more subsets for which machine learning model segments will be created. A request for a machine learning result can be processed using a model segment that would be expected to provide the most accurate results. In some cases, models provided using disclosed technologies can be one or more subsets of a main data set, and a model for the main data set need not be made available. In other cases, a main data set can be made available in addition to models corresponding to subsets of the main data set.

Once a key user has defined what models should be made available, a machine learning framework can train the appropriate models and store the models for use. When an end user submits a request for an interference (i.e., a machine learning result for a particular set of input data, which can be different than data used to train the model or can include all or a portion of training data), the machine learning framework can analyze the request to determine the appropriate model segment to be used. In some cases, particular filters can be presented to a user that correspond to available models, to help ensure that a model is available be used with an end user's request. However, in other cases, the types of inference requests that can be submitted by end users can be unconstrained, or less constrained. If a model segment is not found that suitably corresponds to an inference request, an error message can be presented to a user. Or, if a "custom" model does not exist, a default model (e.g., using an entire training data set) can be used. Or, if filters or filter values are hierarchically organized, the hierarchy can be traversed towards it root, and the most specific model segment that was trained using relevant training data can be selected for use. In the case where a default model is used, a user can be provided with a warning that the results may be less accurate.

Machine learning models are often associated with various settings, at least some of which can be specified by a user for a particular model. These settings, which can also be referred to as hyperparameters, can be used to help "tune" a model for a particular purpose, which can increase the accuracy or usefulness of the results. As an example, C and sigma are hyperparameters for a support vector machines model, while k is a hyperparameter for a k-nearest neighbors model.

For out of the box machine learning solutions, default setting values can be provided. The present disclosure allows a user, such as a key user, to specify values for one or more settings for a machine learning model. When an inference is requested from a machine learning model, a machine learning framework can determine whether any custom settings have been specified for the model (including for a particular use case for the model). If so, the custom settings can be applied when producing a machine learning result. Providing for the use of custom settings with machine learning models that have at least some preconfigured aspects can be useful, as a user can improve the accuracy of machine learning results for particular use cases without having to entirely implement a machine learning model. Similarly, allowing for the use of custom settings can allow model settings to be easily updated, and can allow a base model to be easily customized for a variety of use cases.

Other aspects of a machine learning solution, or aspects of other software (e.g., ERP software) that might be used by, or otherwise affect, a machine learning solution can be customized for individual users (or groups of users, such different organizations, or subgroups within a given organization). These customizable aspects can include configuration data, which can determine things such as the length of data fields (e.g., whether a material ID field is 18 or 40 characters in length), profiles that should be assigned to data to determine how data should behave (e.g., providing object-oriented functionality for data that might not be natively maintained in an object), or rules for automatically populating at least some data. More generally, configuration data can refer to a specific set of values that are desired to be used with software that provides for a variety of options. That is, while configuration data does not change an application's source code, it can affect application behavior. As with settings, including hyperparameters, default values are typically provided for configuration data.

Disclosed technologies provide for storing and applying configuration data, include configuration data useable with machine learning techniques. Maintaining configuration data can include transferring configuration data between different systems associated with a group of users, such as between a test system and a production system. Groups of users can be associated with a profile, which can be used to suggest what configuration settings are made available to the group. In some cases, some configuration settings might not be relevant to a particular group of users, such as because the group is not expected to use certain applications or application functionality, or because it has been indicated that default configuration values are appropriate for the group of users.

Maintaining configuration data can also be useful in helping to ensure correct software operation for a group of users. For example, updates and upgrades can be evaluated for application depending on whether they may conflict with a configuration setting, or if the update or upgrade may improve performance associated with a configuration setting (e.g., a bug is fixed that is known to occur with a particular value for a particular configuration setting). Even when updates or upgrades are applied, storing configuration settings for a group of users can simplify the update/upgrade process, as prior configuration settings can be retrieved and applied (e.g., manual configuration is not needed), including updating configurations settings as needed based on software changes.

Disclosed technologies can help manage machine learning models. A model management component can retrain models, such as according to a schedule or based on model results. In one implementation, model results can be monitored. If the accuracy of results fails to satisfy a threshold, the model can be retrained. Similarly, model validation can also be automated, such as determining whether a model is able to achieve a correct result for a test data set having a known, desired result.

Example 2—Example Architecture Providing for Machine Learning at Local and Cloud Systems FIG. 1 illustrates a computing architecture 100 in which disclosed technologies can be used. Generally, the architecture 100 includes a local system 110 and a cloud-based system 114, which can have respective clients 116, 118. The local system 110 can include application logic 120, which can be logic associated with one or more software applications. The application logic 120 can use the services of a local machine learning component 122.

The local machine learning component 122 can include one or more machine learning algorithms, and optionally one or more specific tasks or processes. For instance, the local machine learning component 122 can have functionality for conducting an association rule mining analysis, where the application logic 120 (including as directed by an end user) can call the associated function of the local machine learning component. In carrying out the requested function, the local machine learning component 122 can retrieve application data 128 from a data store 126, such as a relational database management system. Alternatively, all or a portion of data to be used by the local machine learning component 122 be provided to the local machine learning component by the application logic 120, including after being retrieved by, or on behalf of, the application logic from the data store 126.

The application logic 120 can store, or cause to be stored, data in a remote storage repository 132. The remote storage repository 132 can be, for instance, a cloud-based storage system. In addition, or alternatively, the application logic 120 may access data stored in the remote storage repository 132. Similarly, although not shown, in at least some cases, the local machine learning component 122 may access data stored in the remote storage repository 132.

The local system 110 may access the cloud-based system 114 (in which case the local system may act as a client 118 of the cloud-based system). For example, one or more components of the cloud-based system 114 may be accessed by one or both of the application logic 120 or the local machine learning component 122. The cloud-based system 114 can include a cloud machine learning component 144. The cloud machine learning component 144 can provide various services, such as technical services 146 or enterprise services 148. Technical services 146 can be data analysis that is not tied to a particular enterprise use case. Technical services 146 can include functionality for document feature extraction, image classification, image feature extraction, time series forecasts, or topic detection. Enterprise services 148 can include machine learning functionality that is tailored for a specific enterprise use case, such as classifying service tickets and making recommendations regarding service tickets.

The cloud system 140 can include predictive services 152. Although not shown as such, in at least some cases the predictive services 152 can be part of the cloud machine learning component 144. Predictive services 152 can include functionality for clustering, forecasting, making recommendations, detecting outliers, or conducting "what if" analyses.

Although shown as including a local system 110 and a cloud-based system 114, not all disclosed technologies require both a local system 110 and a cloud-based system 114, or innovations for the local system need not be used with a cloud system, or vice versa.

The architecture 100 includes a machine learning framework 160 that can include components useable to implement one or more various disclosed technologies. Although shown as separate from the local system 110 and the cloud system 114, one or both of the local system or the cloud system 114 can incorporate a machine learning framework 160. Although the machine learning framework 160 is shown as including multiple components, useable to implement multiple disclosed technologies, a given machine learning framework need not include all of the components shown. Similarly, when both the local system 110 and the cloud system 114 include machine learning frameworks 160, the machine learning frameworks can include different combinations of one or more of the components shown in FIG. 1.

The machine learning framework 160 can include a configuration manager 164. The configuration manager 164 can maintain one or more settings 166. In some cases, the settings 166 can be used to configure an application, such as an application associated with the application logic 120 or with an application associated with the local machine learning component 122, the cloud machine learning component 144, or the predictive services 152. The settings 166 can also be used in determining how data is stored in the data store 126 or a data store 170 of the cloud system 114 (where the data store can also store application data 128).

The machine learning framework 160 can include a settings manager 174. The settings manager 174 can maintain settings 176 for use with one or both of the local machine learning component 122, the cloud machine learning component 144, or the predictive services 152. As explained in Example 1, the settings 176 can represent hyperparameters for a machine learning technique, which can be used to tune the performance of a machine learning technique, including for a specific use case.

The machine learning framework 160 can include a model manager 180, which can maintain one or more rules 182. The model manager 180 can apply the rules 182 to determine when a machine learning model should be deprecated or updated (e.g., retrained). The rules 182 can include rules that make a model unavailable or retrain the model using a current training data set according to a schedule or other time-based criterial. The rules 182 can include rules that make a model unavailable or retrain the model using a current data set based on the satisfaction (or failure to satisfy) non-time based criteria. For example, the model manager 180 can periodically examine the accuracy of results provided by a machine learning model. If the results do not satisfy a threshold level of accuracy, the model can be made unavailable for use or retrained. In another aspect, the model manager 180 can test a machine learning model, including after the model has been created or updated, to determine whether the model provides a threshold level of accuracy. If so, the model can be validated and made available for use. If not, an error message or warning can be provided, such as to a user attempting to use the model.

The machine learning framework 160 can include an inference manager 186. The interference manager 186 can allow a user to configure criteria for different machine learning model segments, which can represent segments of a data set (or input criteria, such as properties or attributes that might be associated with a data set used with machine learning model). A configuration user interface 188 (also shown as the configuration user interface 119 of the client system 118) can allow a user (e.g., a key user associated with a client 116 or a client 118) to define segmentation criteria, such as using filters 190. The filters 190 can be used to define model segment criteria, where suitable model segments can be configured and trained by a model trainer component 192.

Trained models (model segments) 194 (shown as models 194a, 194b) can be stored in one or both of the local system 110 or the cloud system 114. The trained models 194 can be models 194a for particular segments (e.g., defined by a filter 190), or can be models 194b that are not constrained by filter criteria. Typically, the models 194b use a training data set that is not restricted by criteria defined by the filters 190. The models 194b can include models that were not defined using (or defined for use with) the machine learning framework 160. The models 194b can be used when the machine learning framework 160 is not used in conjunction with a machine learning request, but can also be used in conjunction with the machine learning framework, such as if filter criteria are not specified or if filter criteria are specified but do not act to restrict the data (e.g., the filter is set to use "all data").

The filters 190 can be read by an application program interface 196 that can allow users (e.g., end users associated with a client 116 or a client 118) to request machine learning results (or inferences), where the filter 190 can be used to select an appropriate machine learning model segment 194a for use in executing the request. As shown, the client 116 can include an inference user interface 117 for making inference requests.

A dispatcher 198 can parse requests received through the application program interface 196 and route the request to the appropriate model segment 194a for execution.

Figure 2:
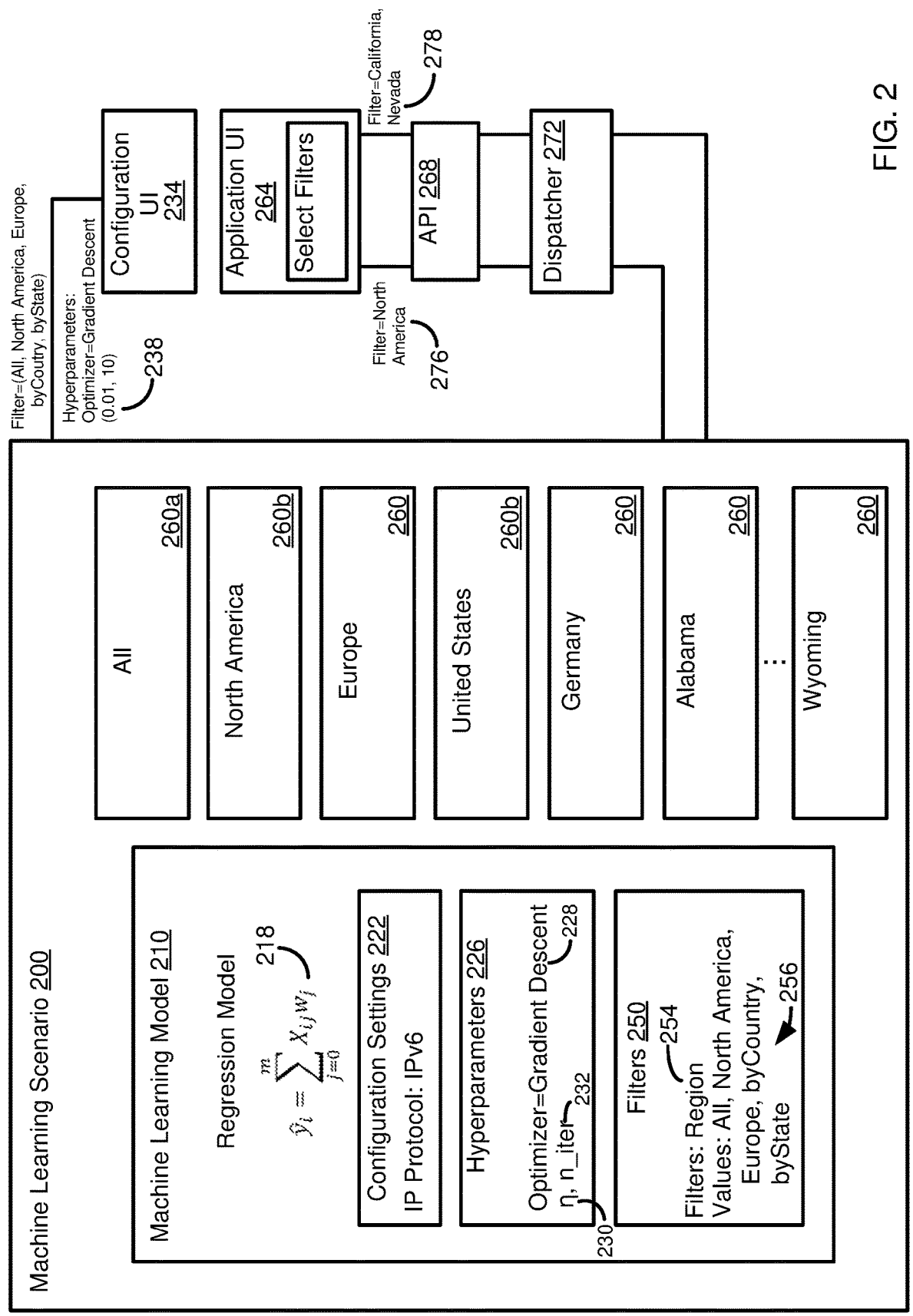
FIG. 2 is a diagram of an example machine learning scenario having model segments.

Example 3—Example Machine Learning Scenarios Providing Model Segments and Customizable Hyperparameters FIG. 2 is a diagram illustrating a machine learning scenario 200 where a key user can define hyperparameters and model segment criteria for a machine learning model, and how these hyperparameters and model segments created using the model segment criteria can be used in inference requests by end users. Although shown as including functionality for setting hyperparameters and model segment criteria, analogous scenarios can be implemented that include functionality for hyperparameters, but not model segment criteria, or which include functionality for model segment criteria, but not hyperparameters.

The machine learning scenario 200 includes a representation of a machine learning model 210. The machine learning model 210 can represent a machine learning model 194 of FIG. 1. The machine learning model 210 is based on a particular machine learning algorithm. As shown, the machine learning model 210 is a linear regression model associated with a function (or algorithm) 218. In some cases, the machine learning scenario 200 includes a reference (e.g., a URI for a location of the machine learning model, including for an API for accessing the machine learning model).

The machine learning model 210 can be associated with one or more configuration settings 222. Consider an example where the machine learning model 214 is used to analyze patterns in traffic on a computer network, including patterns associated with particular geographic regions. A configuration setting 222 can include whether the network protocol uses IPv4 or IPv6, as that can affect, among other things, the number of characters expected in a valid IP address, as well as the type of characters (e.g., digits or alphanumeric). In the case where the machine learning model 214 is provided as an "out of the box" solution for network traffic analysis, the configuration settings 222 can be considered a setting that is not intended to be altered by a key user, and it is a basic setting/parameter for the machine learning model, rather than being used to tune model results.

The machine learning model 214 can further include one or more hyperparameters 226. The hyperparameters 226 can represent parameters that can be used to tune the performance of a particular machine learning model. One hyperparameter is an optimizer 228 that can be used to determine values for use in the function 218 (e.g., for w). As shown, the gradient descent technique has been selected as the optimizer 228. The optimizer 228 can itself be associated with additional hyperparameters, such as, $\eta$, a learning rate (or step size) 230 and a number of iterations 232, "n_iter."

The values of the hyperparameters 226 can be stored, such as in the settings 166 of the configuration manager 164 of FIG. 1. Values for hyperparameters 226 can be set, such as by a key user using a configuration user interface 234 (which can be the configuration user interface 119 of FIG. 1). The scenario 200 shows hyperparameter settings 238 being sent by the configuration user interface 234 to be stored in association with the regression model 214. In addition to setting the optimizer to "gradient descent," the hyperparameters settings 238 set particular values for $\eta$ and for the number iterations to be used.

Particular values for the hyperparameters 226 can be stored in a definition for the machine learning model 214 that is used for a particular machine learning scenario 200. For example, a machine learning scenario 200 can specify the function 218 that should be used with the model, including by specifying a location (e.g., a URI) or otherwise providing information for accessing the function (such as an API call). The definition can also include values for the hyperparameters 226, or can specify a location from which hyperparameter values can be retrieved, and an identifier that can be used to locate the appropriate hyperparameter values (which can be an identifier for the machine learning model scenario 200). Although a user (or external process) can specify values for some or all of the hyperparameters 226, a machine learning scenario 200 can include default hyperparameters values that can be used for any hyperparameters whose values are not explicitly specified.

One or more filters 250 can be defined for the machine learning scenario 200, and can correspond to the filters 190 of FIG. 2. The filters 250 can be used to define what machine learning model segments are created, what machine learning model segments are made available, and criteria that can be used to determine what machine learning model segment will be used to satisfy a particular inference request.

FIG. 2 illustrates that filters 250 can have particular types or categories, and particular values for a given type or category. In particular, the machine learning scenario 200 is shown as providing filters for a region type 254, where possible values 256 for the region type include all regions, all of North America, all of Europe, values by country (e.g., Germany, United States), or values by state (e.g., Alaska, Nevada). Although a single filter type is shown, a given machine learning scenario 200 can include multiple filter types. In the example of network traffic analysis, additional filters 250 could include time (e.g., traffic during a particular time of a day), a time period (e.g., data within the last week), or traffic type (e.g., media streaming) When multiple filter categories are used, model segments can be created for individual values of individual filters (or particular values selected by a user) or for combinations of filter values (e.g., streaming traffic in North America), where the combinations can optionally be those explicitly specified by a user (particularly in the case where multiple filter types and/or multiple values for a given type exist, which can vastly increase the number of model segments).

Model segments 260 can be created using the filters 250. As shown, model segments 260 are created for the possible value of the region filter type 254, including a model segment 260a that represents an unfiltered model segment (e.g., includes all data). In some cases, the model segment 260a can be used as a default model segment, including in an inference request that is received that includes parameters that cannot be mapped to a more specific model segment 260.

When an end user wishes to request an inference (that is, obtain a machine learning result, optionally included an explanation as to its practical significance, for a particular set of input data), the user can select a data set and optionally filters using an application user interface 264. In at least some cases, filters (both types and possible values) presented in the application user interface 264 correspond to filters 250 (including values 256) defined for a given machine learning scenario 200 by a key user. Available filters 250, and possibly values 256, can be read from a machine learning scenario 200 and used to populate options presented in the application user interface 264.

In other cases, the application user interface 264 can provide fewer, or no, constraints on possible filter types 254 or values 256 that can be requested using the application user interface 264. When an interference request is sent from the application user interface 264 for processing, a dispatcher 272 can determine one more model segments 260 that may be used in processing the request, and can select a model segment (e.g., based on which model segment would be expected to provide the most accurate or useful results). If no suitable model segment 260 is found, an error can be returned in response to the request. Or a default model segment, such as the model segment 260a, can be used.

The inference request can be sent to an application program interface 268, which can be the application program interface 196 of FIG. 1. The application program interface 268 can accept inference requests, and return results, on behalf of the dispatcher 272 (which can be the dispatcher 198 of FIG. 1). The dispatcher 272 can determine for a request received through the API 268 what model segment 260 should be used for the request. The determination can be made based on filter values 256 provided using the application user interface 264.

As an example, consider a first inference request 276 that includes a filter value of "North America." The dispatcher 272 can determine that model segment 260b matches that filter value and can route the first inference request 276 to the model segment 260b for processing (or otherwise cause the request to be processed using the model segment 260b). A second inference request 278 requests that data be used for California and Nevada. The dispatcher 272 can review the available model segments 260 and determine that no model segment exactly matches that request.

The dispatcher 272 can apply rules to determine what model segment 260 should be used for an inference request when no model segment exactly matches request parameters. In one example, model segments 260 can have a hierarchical relationship. For instance, filter types 254 or values 256 can be hierarchically organized such that "North America" is known to be a subset of the "all values" model segment 260a. Similarly, the filter values can be organized such that a U.S. state is known to be a subset of "United States," where in turn "United States" can be a subset of "North America." If no model segment 260 matches a given level of a filter hierarchy, the next higher (e.g., more general, or closer to the root of the hierarchy) can be evaluated for suitability.

For the second inference request 278, it can be determined that, while segments models 260 may exist for California and Nevada separately; no model exists for both (and only) California and Nevada. The dispatcher 272 can determine that a segment model 260d for "United States" is a model segment higher in the filter hierarchy that is that most specific model segment that includes data for both California and Nevada. While the model segment 260b for North America also includes data for California and Nevada, it is less specific than the model segment 260d for the United States.

Figure 3:
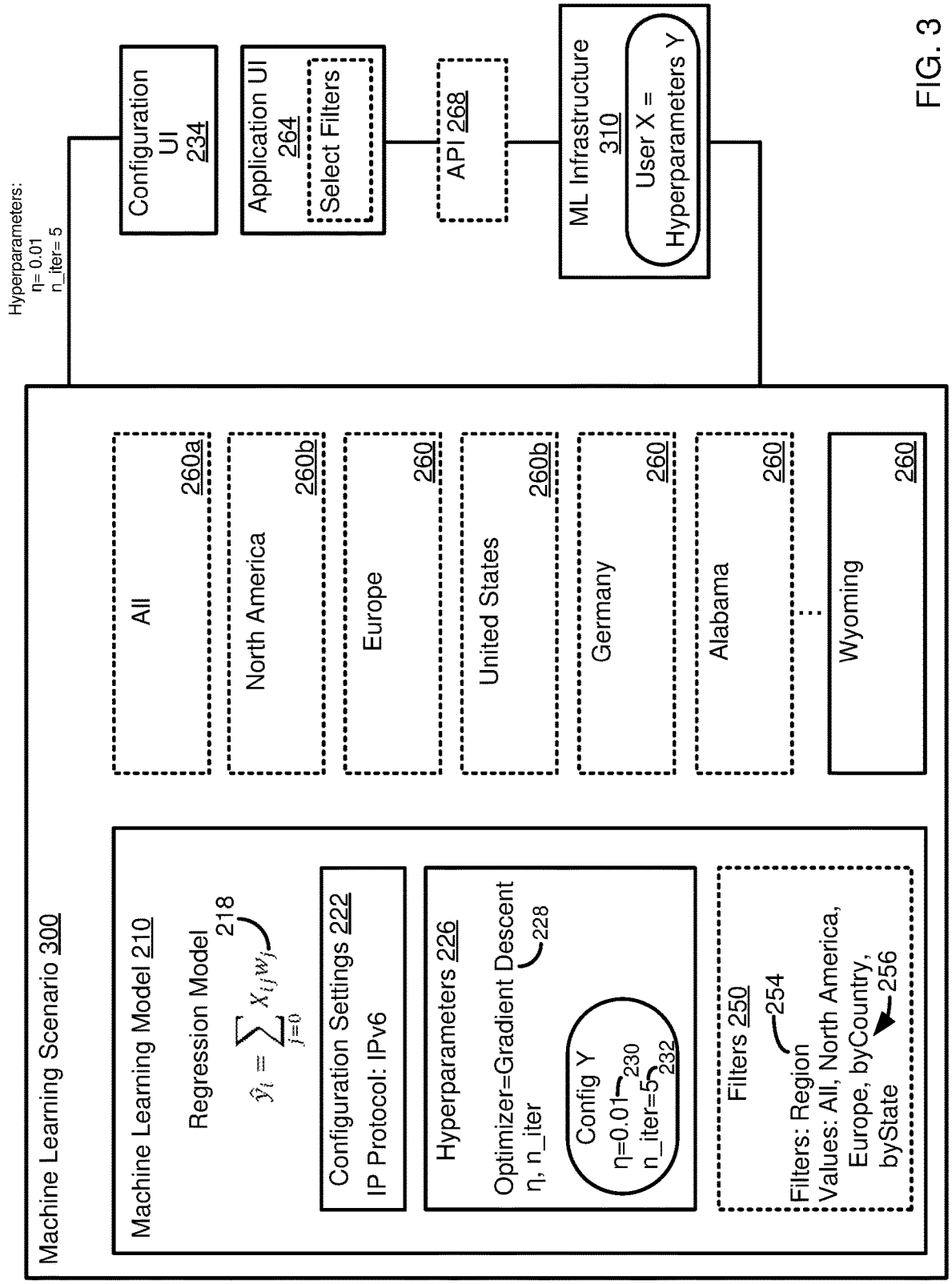
FIG. 3 is a diagram of an example machine learning scenario having customized hyperparameters.

FIG. 3 illustrates a machine learning scenario 300 that is generally similar to the machine learning scenario 200 of FIG. 2 and illustrates how hyperparameter information can be determined for a given inference request. Assume that a user enters an inference request using the application user interface 264. Machine learning infrastructure 310, which can correspond to the machine learning framework 160, can determine whether the inference request is associated with particular hyperparameters values or if default values should be used. Determining whether a given inference request is associated with specific hyperparameters can include determining a particular user or process identifier is associated with specific hyperparameter values. Information useable to determine whether an inference request is associated with specific hyperparameter values can optionally be included in a call to the application program interface 268 (e.g., the call can include as arguments one or more of a process ID, a user ID, a system ID, a scenario ID, etc.). If no specific hyperparameter values are found for a specific inference request, default values can be used.

There can be advantages to implementations where functionality for model segments is implemented independently of functionality for hyperparameters. That is, for example, a given set of trained model segments can be used with scenarios with different hyperparameter values without having to change the model segments or a process that uses the model segments. Similarly, the same hyperparameters can be used with different model segments or interference request types (e.g., a given set of hyperparameters can be associated with multiple machine learning scenarios 200), so that hyperparameter values do not have to be separately defined for each model segment/inference request type.

Figure 4:
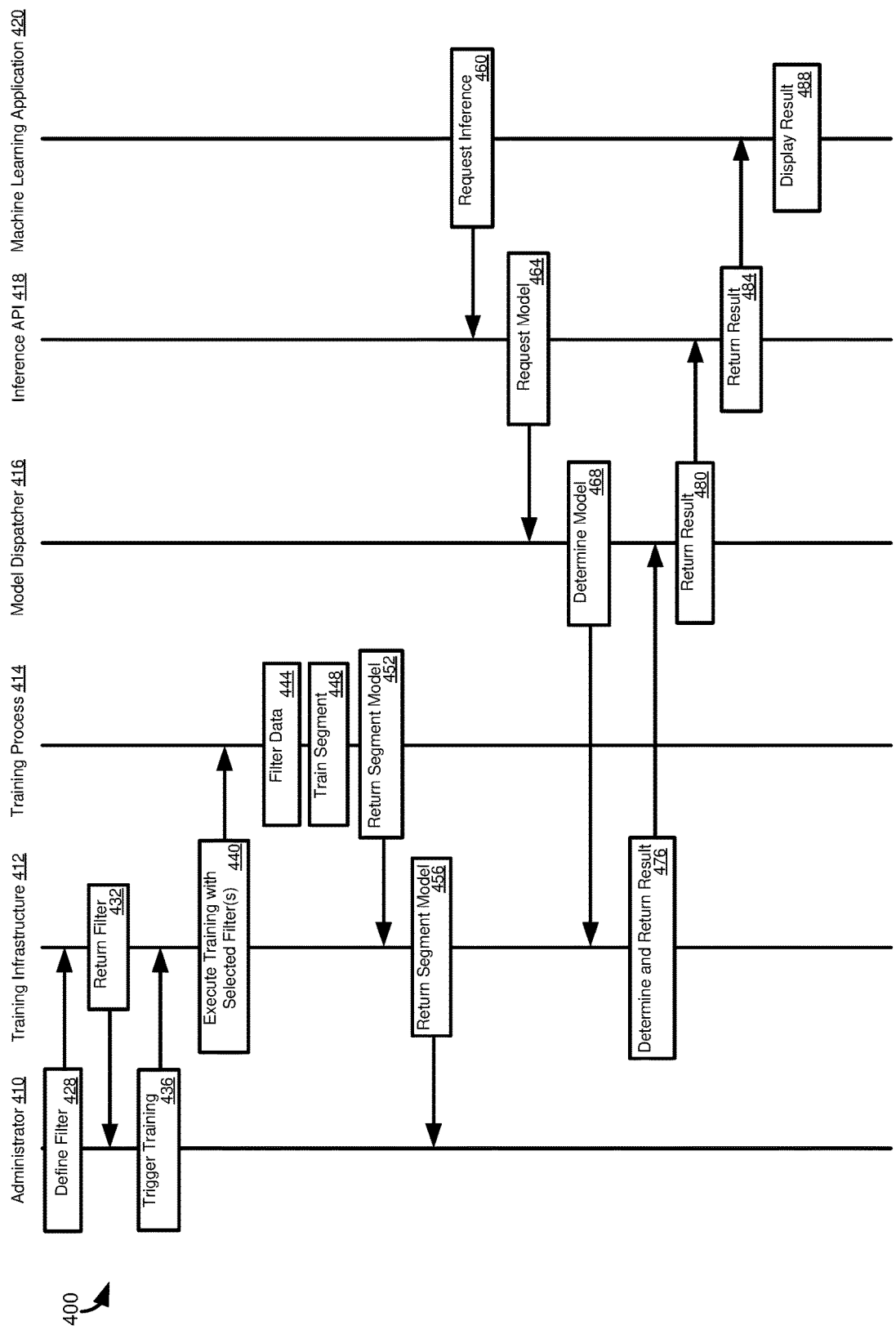
FIG. 4 is a timing diagram illustrating a process for training a machine learning model with multiple model segments, and use thereof.

Example 4—Example Process for Training and Use of Machine Learning Model Segments FIG. 4 is a timing diagram illustrating an example process 400 for defining and using model segments. The process 400 can be implemented in the computing environment 100 of FIG. 1, and can represent a particular instance of the scenario 200 of FIG. 2.

The process 400 can be carried out by an administrator 410 (or, more technically, an application that provides administrator functionality, such as to a key user), a training infrastructure 412 (e.g., the machine learning framework 160 of FIG. 1), a training process 414 (e.g., carried out by the machine learning component 122, the cloud machine learning component 144, or the predictive services 152 of FIG. 1), a model dispatcher 416 (e.g., the dispatcher 198), an inference API 418 (e.g., the API 196), and a machine learning application 420 (e.g., an application executing on a client device 116, 118, or a machine learning application executing on the local system 110 or the cloud system 114).

Initially, the administrator 410 can define one or more filters at 428. The one or more filters can include one or more filter types, and one or more filter values for each filter type. In at lease some cases, the filter types, and values, correspond to attributes of a data set to be used with a machine learning model, or metadata associated with such a data set. In the case where data (input or training) is stored in relational database tables, the filter types can correspond to particular table attributes, and the values can correspond to particular values found in the data set for those attributes. Or, the filter types can correspond to a dimensional hierarchy, such as associated with an OLAP cube or similar multidimensional data structure.

The filters defined at 428 are sent to the training infrastructure 412. The training infrastructure 412, at 432, can register the filters in association with a particular machine learning model, or a particular scenario (which can have an identifier) that uses the model. The model/scenario can be used, for example, to determine which filter (and in some cases filter values) should be displayed to an end user for generating an inference request. While in some cases filter values can be explicitly specified, in other cases they can be populated from a data set based on filter types. For example, if a filter type is "state," and a data set includes only data for Oregon and Arizona, those values could be provided as filter options, while filter values for other states (e.g., Texas) would not be displayed as options. An indication that the filter has been defined and is available for use can be sent from the training infrastructure 412 to the administrator 410.

At 436, the administrator 410 can trigger training of model segments using the defined filter by sending a request to the training infrastructure 412. The training infrastructure 412 can use the requested filters to define and execute a training job at 440. The training job is sent to the training process 414. The training process 414 filters training data at 444 using the defined filters. The model segment is then trained using the filtered data at 448. The segment models are returned (e.g. registered or indicated as active) to the training infrastructure 412 by the training process 414 at 452. At 456, the segment models are returned by the training infrastructure 412 to the administrator 410.

The machine learning application 420 can request an inference at 460. The inference request can include an identification of one or more filter types, having one more associated filter values. The inference request is sent from the machine learning application 420 to the inference API 418. At 464, the inference API 418 forwards the inference request to the model dispatcher 416. The model dispatcher 416, at 468, determines a model segment to be used in processing the inference request. The determination can be made based on the filter types and values included in the inference request from the machine learning application 420, and can be carried out as described for the scenario 200 of FIG. 2.

The model dispatcher 416 sends the inference request to the training infrastructure 412, to be executed on the appropriate model segment (as determined by the model dispatcher). The training infrastructure 412 determines a machine learning result, which can include an inference drawn from the result, at 476, and sends the result to the model dispatcher 416, which in turn returns the result at 480 to the API 418, and the API can return the result to the machine learning application 420 at 484. The machine learning application 420 can display the machine learning result, such as to an end user, at 488.

Example 5—Example Data Artefact Including Model Segment Filters

FIG. 5 illustrates an example definition 500 for a data artefact, such as a data artefact of a virtual data model, illustrating how segmentation information can be provided. The definition is a Core Data Service view definition, as used in products available from SAP SE, of Walldorf, Germany.

The definition 500 includes code 510 defining data referenced by the view, which can be used to construct a data artefact in a database (e.g., in a data model for the data, such as in an information schema or data dictionary for a physical data model for the database) corresponding to the view. The definition 500 includes elements 514, 516, which are attributes (in this case, non-key attributes) that can be used for model segmentation. In some cases, the elements 514, 516 can represent elements that a key user can select for creating model segments. In other cases, the elements 514, 516 represent filters that have been defined for a model, and for which corresponding model segments have been created (e.g., using the process 400 of FIG. 4). Generally, key or non-key attributes included in the definition 500 can be used to define model segments.

Example 6—Example User Interface Screens for Configuring Machine Learning Models FIGS. 6-9 provide a series of example user interface screens illustrating how a machine learning scenario (e.g., a particular application of a particular machine learning model) can be configured to use disclosed technologies. The screens can represent screens that are provided to a key user, such as in the configuration user interface 119 of the client 118 of FIG. 1 (or the configuration user interface 234 of FIG. 2 or FIG. 3).

Figure 6:
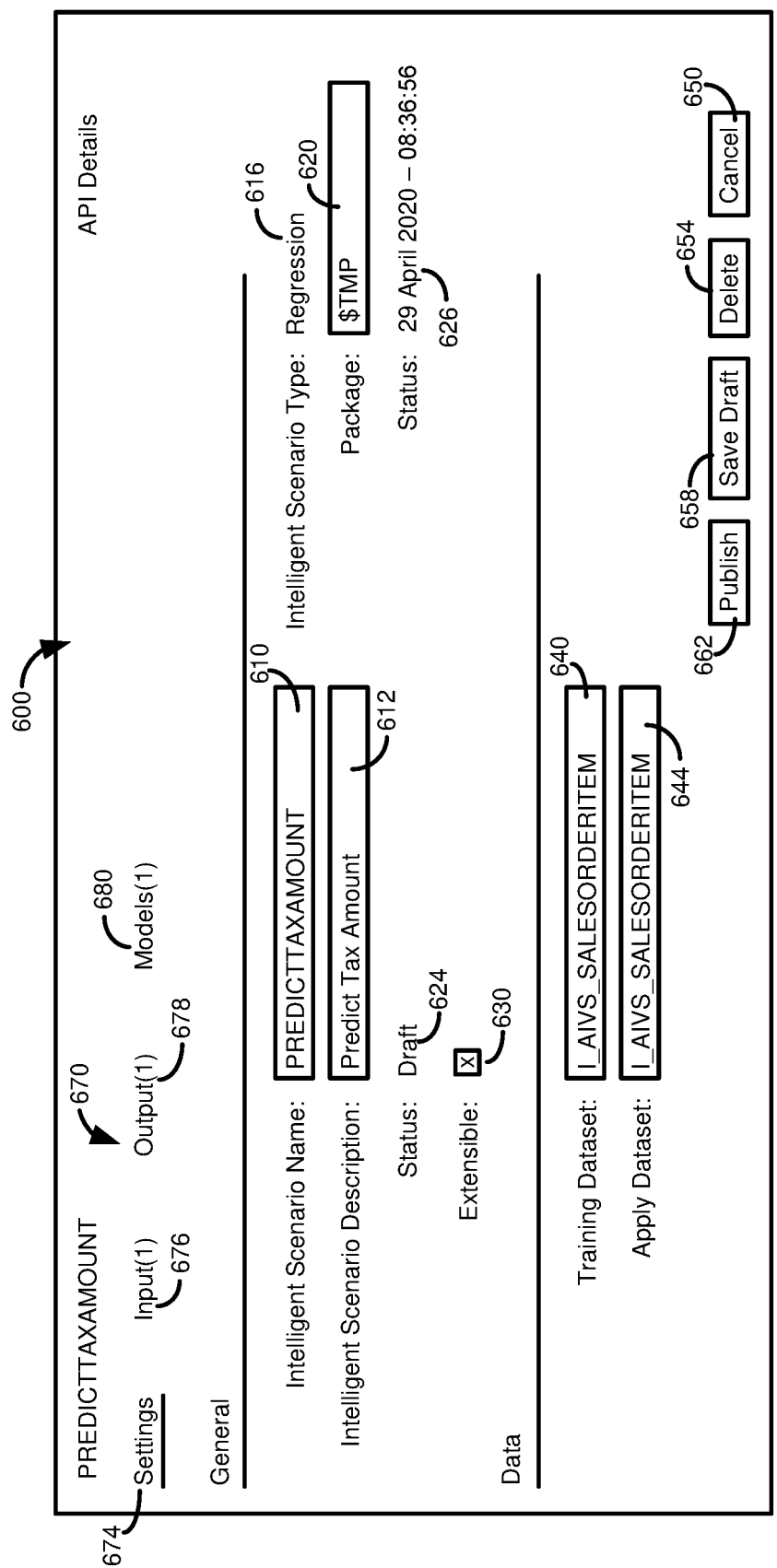
FIGS. 6-11 are example user interface screens allowing a user to configure a machine learning model, including model segments and custom hyperparameters.

FIG. 6 provides an example user interface screen 600 that allows a user to provide basic definitional information for a machine learning scenario, including entering a name for the scenario in a field 610 and a description for the scenario in a field 612. A field 616 provides a type for the scenario, which can represent a particular machine learning algorithm that is to be used with the scenario. In some cases, the field 616 can be linked to available machine learning algorithms, such that a user may select from available options, such as using a drop down menu.

A package, which can serve to contain or organize development objects associated with the machine learning scenario, can be specified in a field 620. In other cases, the package can indicate a particular software package, application, or application component with which the scenario is associated. For example, the value in the field 620 can indicate a particular software program with which the scenario 600 is associated, where the scenario can be an "out of the box" machine learning scenario that is available for customization by a user (e.g., a key user).

A status 624 of the scenario can be provided, as can a date 626 associated with the status. The status 624 can be useful, such as to provide an indication as to whether the scenario has already been defined/deployed and is being modified, or if the scenario is currently in a draft state. A user can select whether a scenario is extensible by selecting (or not) a check box 630. Extensible scenarios can be scenarios that are customizable by customers/end users, where extensible customizations are configured to be compatible with any changes/updates to the underlying software. Extensible scenarios can allow for changes to be made such as changing a machine learning algorithm used with the scenario, extending machine learning logic (such as including transformations or feature engineering), or extending a consumption API for a model learning model.

One or more data sets to be used with the machine learning scenario can be selected (or identified) using fields 640, 644, for training data and inference data, respectively.

Once a scenario has been defined/modified, a user can choose to take various actions. If a user wishes to discard their changes, they can do so be selecting a cancel user interface control 650. If a user wishes to delete a scenario (e.g., a customized scenario) that has already been created, they can do so by selecting a delete user interface control 654. If the user wishes to save their changes, but not activate a scenario for use, they can do so by selecting a save draft user interface control 658. If the user wishes to make the scenario available for use, they can do so by selecting a publish user interface control 662.

Navigation controls 670 can allow a user to navigate between the screens shown in FIGS. 6-9, to define various aspects of a scenario. The scenario settings screen 600 can be accessed by selecting a navigation control 674. An input screen 700, shown in FIG. 7, can be accessed by selecting a navigation control 676. An output screen 800, shown in FIG. 8, can be accessed by selecting a navigation control 678. A screen 900, shown in FIG. 9, providing information for models used in the scenario, can be accessed by selecting a navigation control 680.

Figure 7:
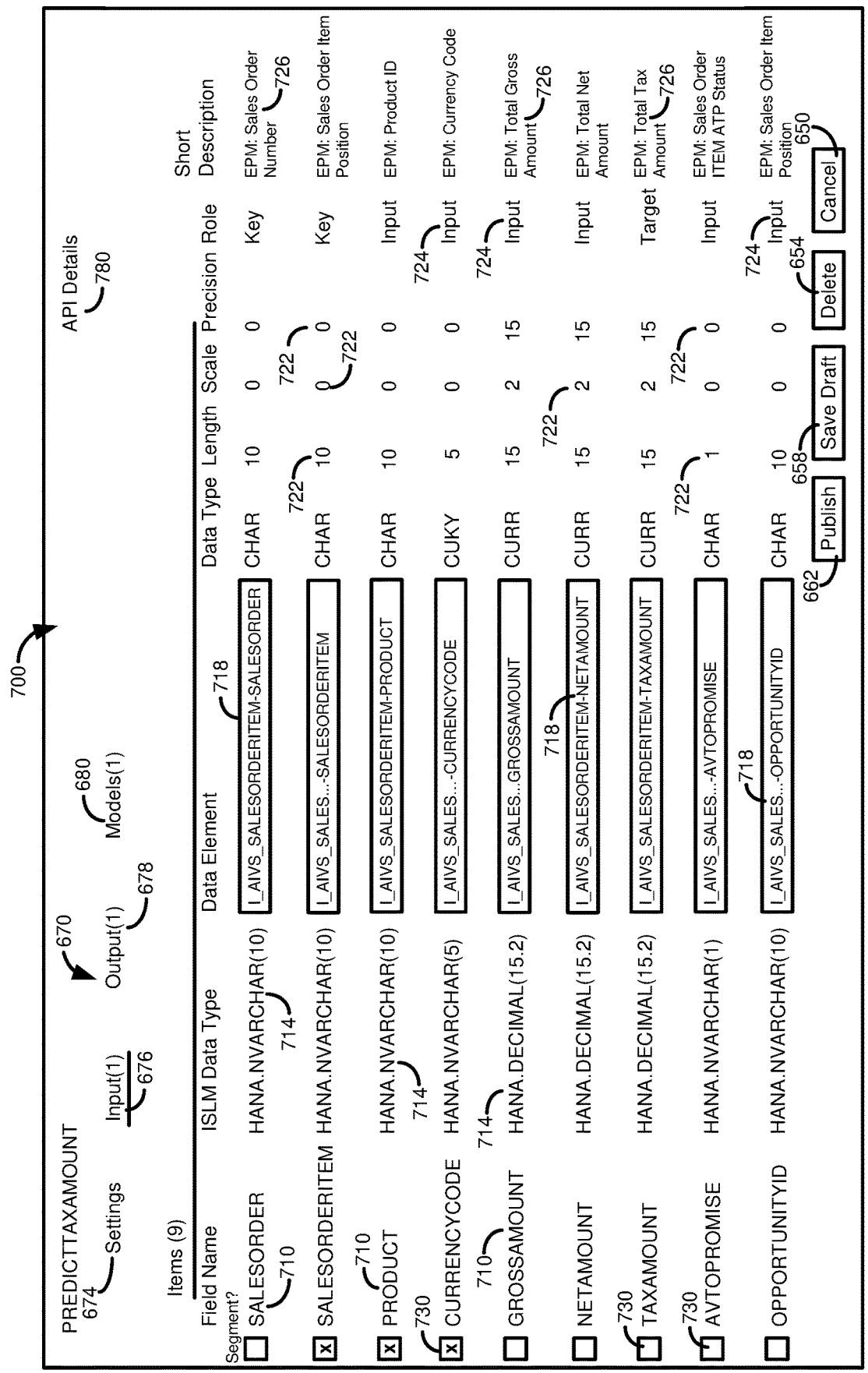
Figure 8:
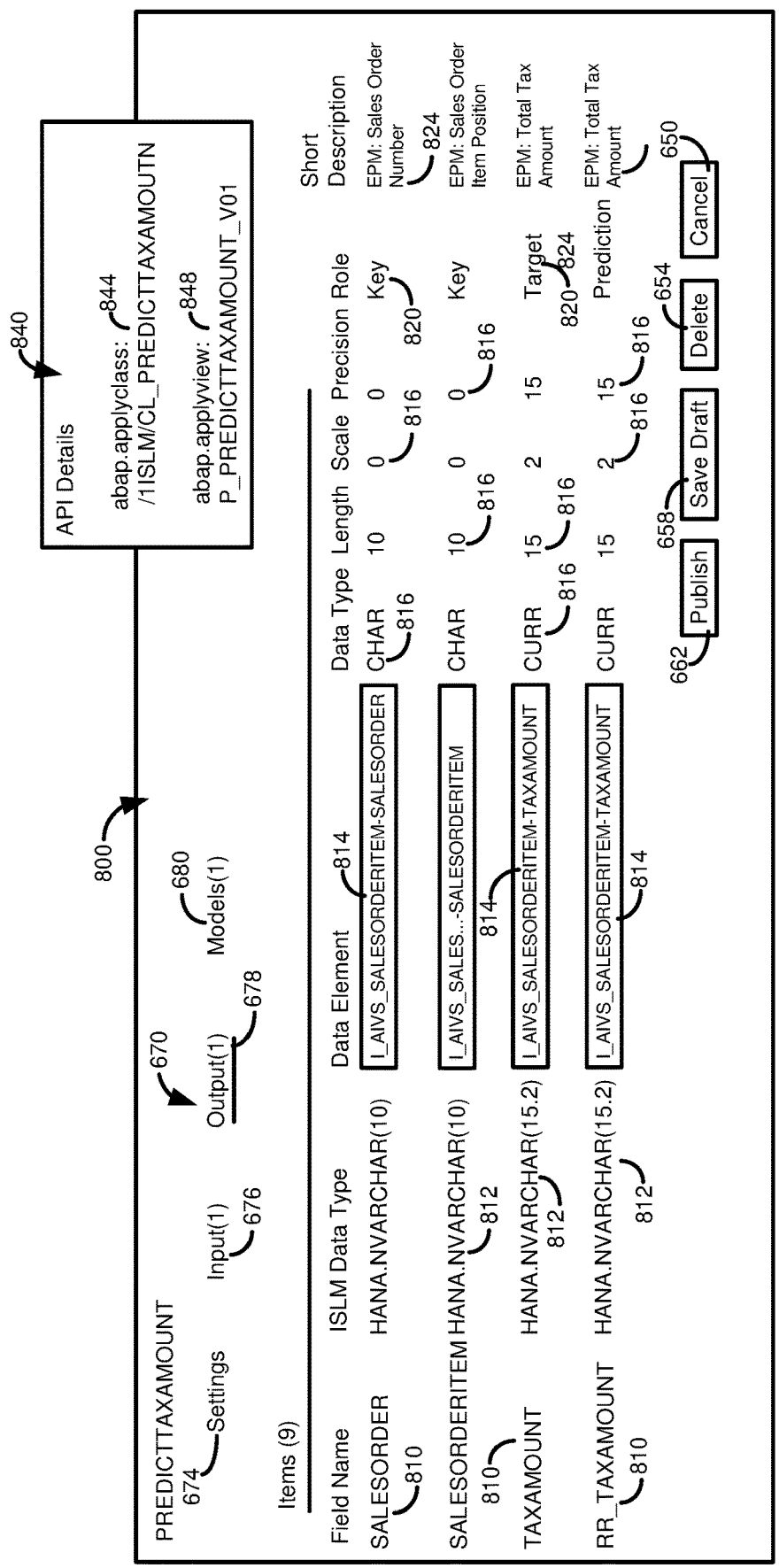

FIG. 7 presents a user interface screen 700 that allows a user to view attributes that are used to train a model used for the scenario. In some cases, the attributes are pre-defined for a given scenario, but are expected to match the training or inference (e.g. input/apply) data sets specified using the fields 640, 644 of FIG. 6. In other cases, the attributes are populated based on the data sets specified using the fields 640, 644.

For each attribute, the user interface screen 700 lists the name 710 of the field, the data type 714 used by the machine learning model associated with the scenario, a data element 718 (e.g., a data element defined in a data dictionary and associated with the attribute, where a data element can be a data element as implemented in products available from SAP SE, of Walldorf, Germany) of the source data set (which type can be editable by a user), details 722 regarding the data type (e.g., a general class of the data type, such as character or numerical, a maximum length, etc.), a role 724 for the attribute (e.g., whether it acts as a key, or unique identifier, for data in a data set, serves as a non-key input, or whether it is an attribute whose value is to be predicted using a machine learning algorithm), and a description 726 for the attribute.

In a specific implementation, a user may select attributes of the user interface screen 700 to be used to define model segments. For example, a user may select attribute to be used for model segment definition by selecting a corresponding checkbox 730 for the attribute. In the implementation shown, attributes selected using checkboxes 730 can be used to define filter types or categories. An underlying data set can be analyzed to determine particular filter values that will be made available for a given data set. In other cases, the user interface screen 700 can provide an input field that allows a user to specify particular values for attributes used for model segmentation.

The user interface screen 700 can include the navigation controls 670, and options 650, 654, 658, 662 for cancelling input, deleting a scenario, saving a draft of a scenario, or publishing a scenario, respectively.

The user interface screen 800 can be generally similar to the user interface screen 700, but is used to provide information, and optionally configure, information for attributes or other values (e.g., machine learning results) provided as output of a machine learning scenario/model.

The user interface screen 800 displays the name 810 for each attribute, the data type 812 used by the machine learning algorithm, a field 814 that lists a data element associated with the attribute (which can be edited by a user), and data type information 816 (which can be analogous to the data type information 722 of FIG. 7). The user interface screen 800 can also list a role 820 for each attribute as well as a description 824 for the attribute. The roles 820 can be generally similar to the roles 724. As shown, the roles 820 can indicate whether the output attribute identifies a particular record in a data set (including a record corresponding to a machine learning result), whether the attribute is a target (e.g., that is determined by the machine learning algorithm, as opposed to being an input value), or whether the result is a predicted value. In some cases, a predicted attribute can be an attribute whose value is determined by a machine learning algorithm and which is provided to a user as a result (or otherwise used in determining a result presented to a user, such as being used to determine an inference, which is then provided to a user). A target attribute can be an attribute whose value is determined by a machine learning algorithm, but which may not be, at least directly, provided to a user. In some cases, a particular data can have multiple roles, and can be associated with (or listed as) multiple attributes, such as being both a target attribute and a prediction attribute.

The user interface screen 800 also shows details 840 for an application program interface associated with the scenario being defined. The details 840 can be presented upon selection of a user interface control (not shown in FIG. 8, but which can correspond to a control 780 shown in FIG. 7). The details 840 can identify a class (e.g., in an object oriented programming language) 844 that implements the API and an identifier 848 for a data artefact in a virtual data model (e.g., the view 500 of FIG. 5) that specifies data to be used in generating an inference. In at least some cases, the API identified in the details 840 can include functionality for determining a model segment to be used with an inference request, or at least accepting such information which can be used by another component (such as a dispatcher) to determine which model segment should be used in processing a given inference request. The data artefact definition of FIG. 5 can represent an example of a data artefact identified by the identifier 848.

The user interface screen 800 can include the navigation controls 670, and options 650, 654, 658, 662 for cancelling input, deleting a scenario, saving a draft of a scenario, or publishing a scenario, respectively.

Figure 9:
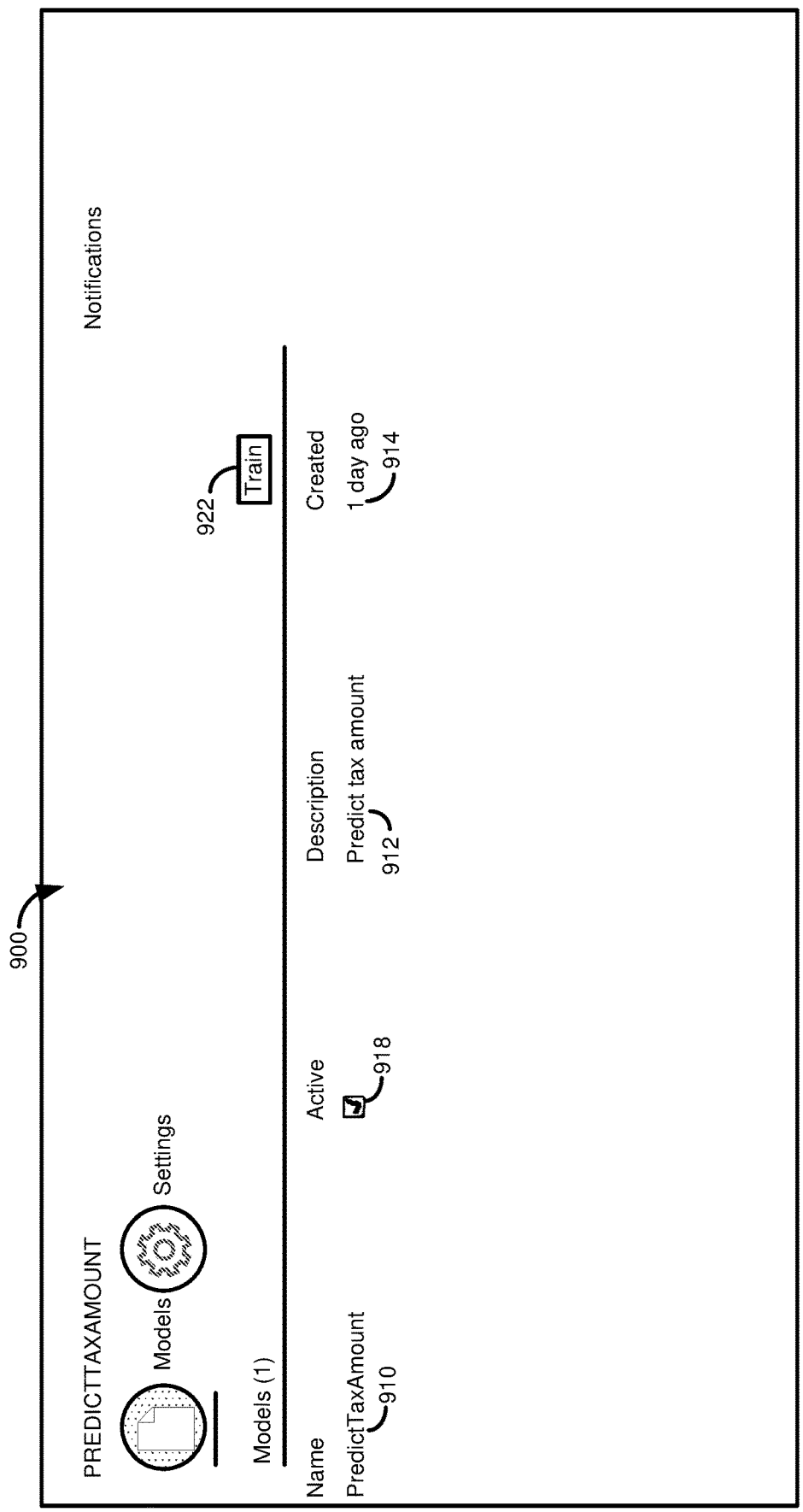

The user interface screen 900 of FIG. 9 can provide information about particular customized machine learning scenarios that have been created for a given "out of the box" machine learning scenario. The user interface screen 900 can display a name 910 for each model, a description 912 of the model, and a date 914 the model was created. A user can select whether a given model is active (e.g., available for use by end users) by selecting a check box 918. A user can select to train (or retrain) one or more models for a given scenario by selecting a train user interface control 922. Selecting a particular model (e.g., by selecting its name 910) can cause a transition to a different user interface screen, such as taking the user to the settings user interface screen 600 with information displayed for the selected scenario.

Figure 10:
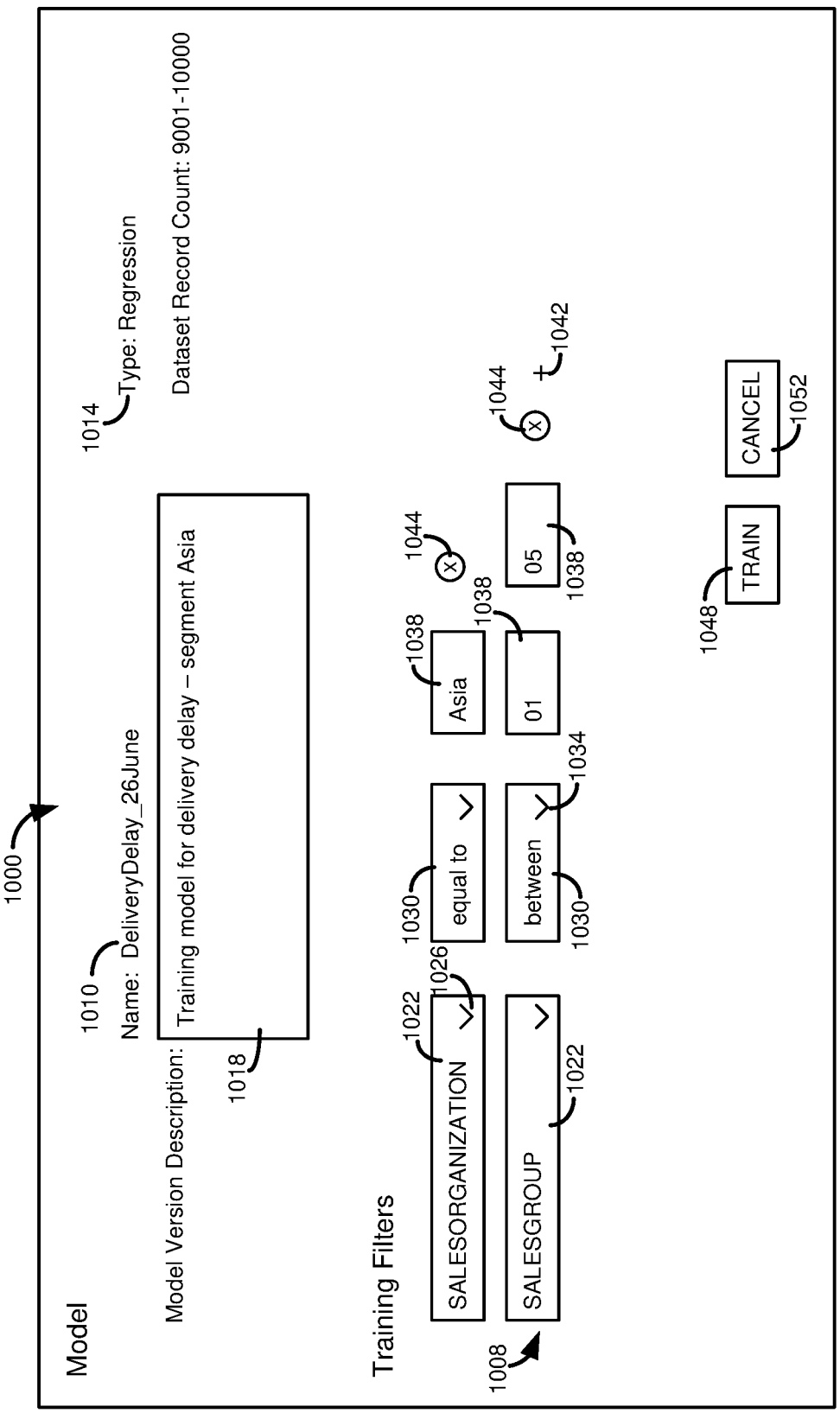

Example 7—Example User Interface Screen for Defining Machine Learning Model Segments FIG. 10 provides another example user interface screen 1000 through which a user can configure filters that can be used to generate model segments that will be available to end users for requests for machine learning results. The user interface screen 1000 can display a name 1010 for the overall model, which can be specified in the screen 1000 or can be populated based on other information. For example, the screen 1000 can be presented to a user in response to a selection on another user interface screen (e.g., the user interface screen 600 of FIG. 6) to create model segments, and the model name can be populated based on information provided in that user interface screen, or another source of information defining a machine learning model or scenario. Similarly, the screen 1000 can display the model type 1014, which can be populated based on other information. The screen 1000 can provide a field, or text entry area, 1018 where a user can enter a description of the model, for explanation purposes to other uses, including criteria for defining model segments.

A user can define various training filters 1008 using the screen 1000. Each filter 1008 can be associated with an attribute 1022. In some cases, a user may select from available attributes using a dropdown selector 1026. The available attributes can be populated based on attributes associated with a particular input or training dataset, or otherwise defined for a particular machine learning scenario. Each filter 1008 can include a condition type (e.g., equals, between, not equal to) 1030, which can be selected using a dropdown selector 1034. Values to be used with the condition 1030 can be provided in one or more fields 1038. A user may select to add additional filters, or delete filters, using controls 1042, 1044, respectively.

Once the filters 1008 have be configured, a user can choose to train one or more model segments using the filters by selecting a train user interface control 1048. The user can cancel defining model segments by selecting a cancel user interface control 1052.

Figure 11:
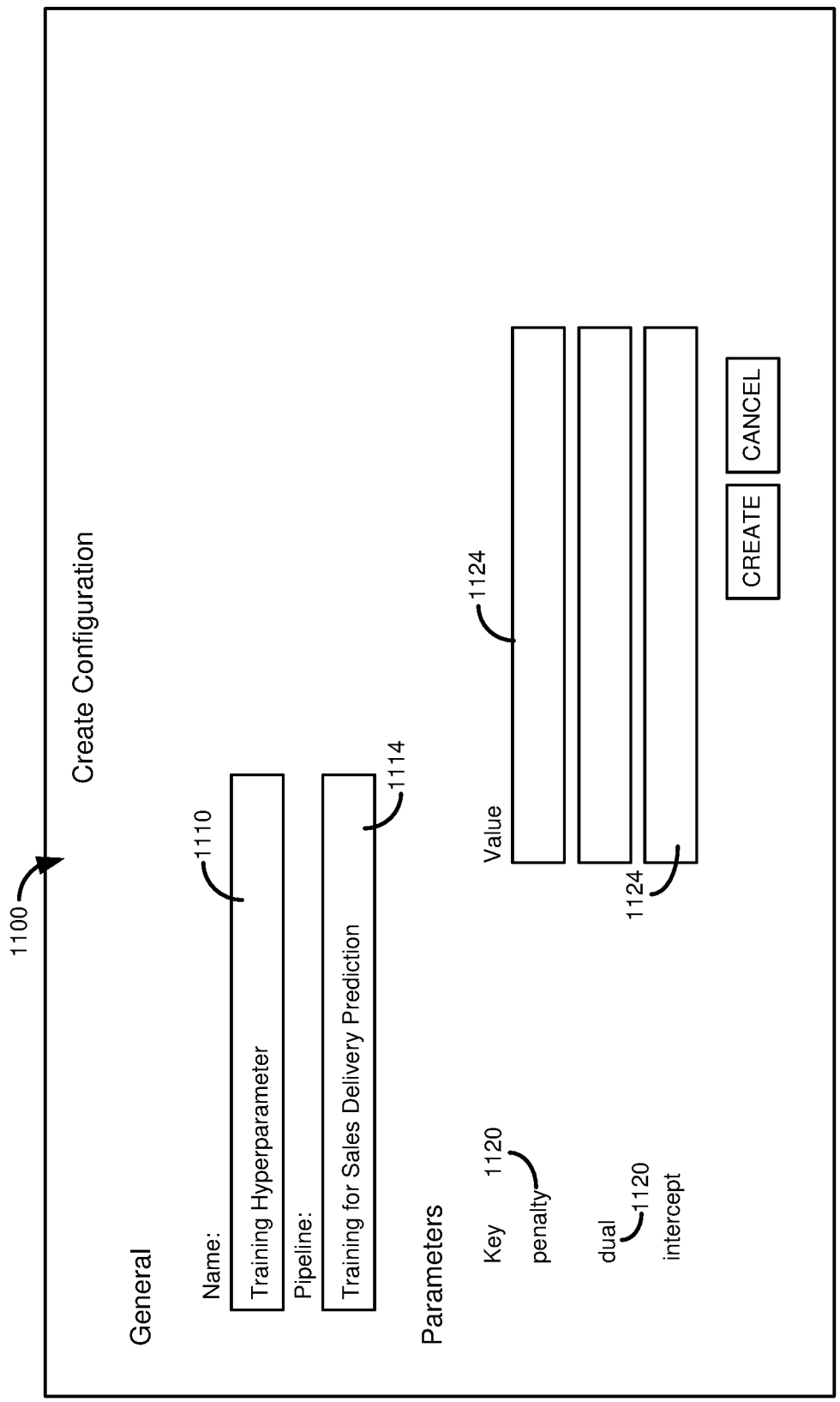

Example 8—Example User Interface Screen for Defining Custom Hyperparameters for a Machine Learning Model FIG. 11 provides an example user interface screen 1100 through which a user can define hyperparameters to be used with a machine learning model. Depending on the machine learning algorithm, the hyperparameters can be used during one or both of training a machine learning model and in using a model as part of responding to a request for a machine learning result.

The user interface screen 1100 includes a field 1110 where a user can enter a name for the hyperparameter settings, and a field 1114 where a user can enter a pipeline where the hyperparameter settings will be used. In some cases, a pipeline can represent a specific machine learning scenario. In other cases, a pipeline can represent one or more operations that can be specified for one or more machine learning scenarios. For example, a given pipeline might be specified for two different machine learning scenarios which use the same machine learning algorithm (or which have at least some aspects in common such that the same pipeline is applicable to both machine learning scenarios).

For each hyperparameter available for configuration, the user interface screen can provide a key identifier 1120 that identifies the particular hyperparameter and a field 1124 where a user can enter a corresponding value for the key. The keys and values can then be stored, such as in association with an identifier for the pipeline indicated in the field 1114. In at least some cases, the hyperparameters available for configuration can be defined for particular machine learning algorithms Typically, while a key user may select values for hyperparameters, a developer of a machine learning platform (e.g., the local machine learning component 122 or the cloud machine learning component 144 or predictive services 152 of FIG. 1) defines what hyperparameters will be made available for configuration.

Figure 12:
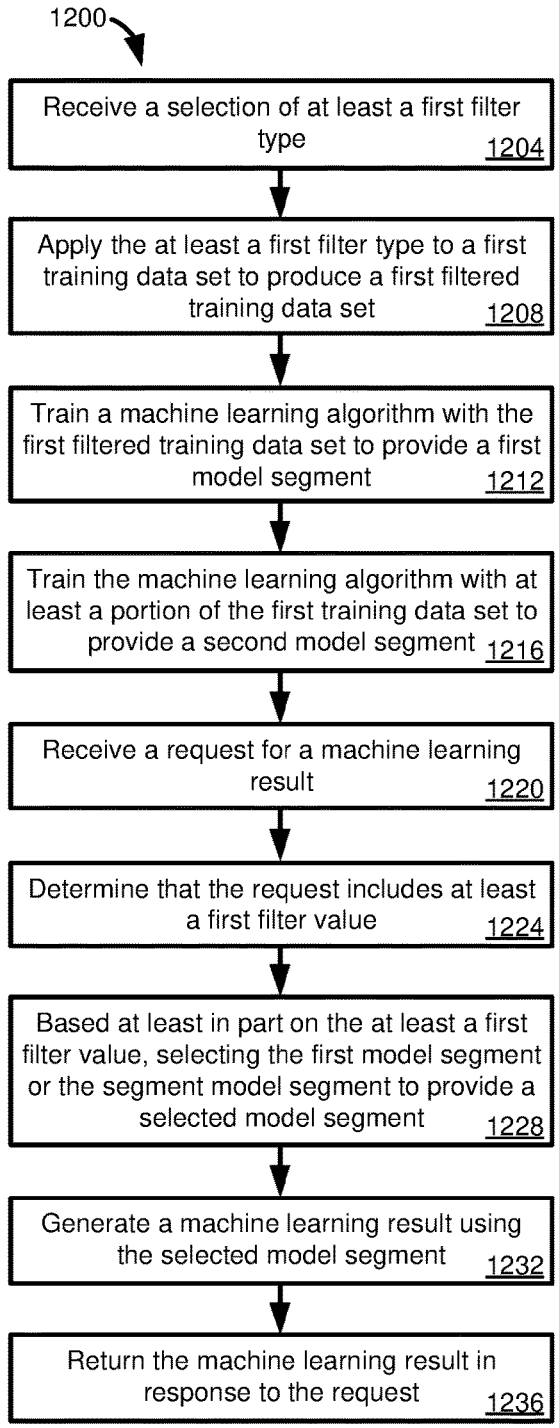
FIG. 12 is a flowchart illustrating an example method for training multiple segments of a machine learning model, and use thereof.

Example 9—Example Configuration and Use of Machine Learning Models Having Model Segments and/or Custom Hyperparameters FIG. 12 is a flowchart of an example method 1200 for training multiple machine learning model segments and routing a machine learning request to an appropriate model segments. The method 1200 can be carried out using the computing architecture 100 of FIG. 1, and can use a machine learning scenario 200 as shown in FIG. 2. The process 400 of FIG. 4 can represent a particular example of the method 1200.

At 1204, a selection of at least a first filter type is received. The selection can be, for instance, user input provided by a key user through a configuration user interface. The at least the first filter is applied to a first training data set to produce a first filtered training data set at 1208.

At 1212, a machine learning algorithm is trained with the first filtered training data set to provide a first model segment. The machine learning algorithm is trained at 1216 with at least a portion of the first training data set to provide a second model segment. The at least the portion of the first training data set is different than the first filtered training data set.

At 1220, a request is received for a machine learning result, such as from an end user application, which can be received through an API. It is determined at 1224 that the request includes at least a first filter value. Based at least in part on the at least the first filter value, at 1228, the first model segment or the segment model segment is selected to provide a selected model segment. At 1232, a machine learning result is generated using the selected model segment. The machine learning result is returned at 1236 in response to the request.

Figure 13:
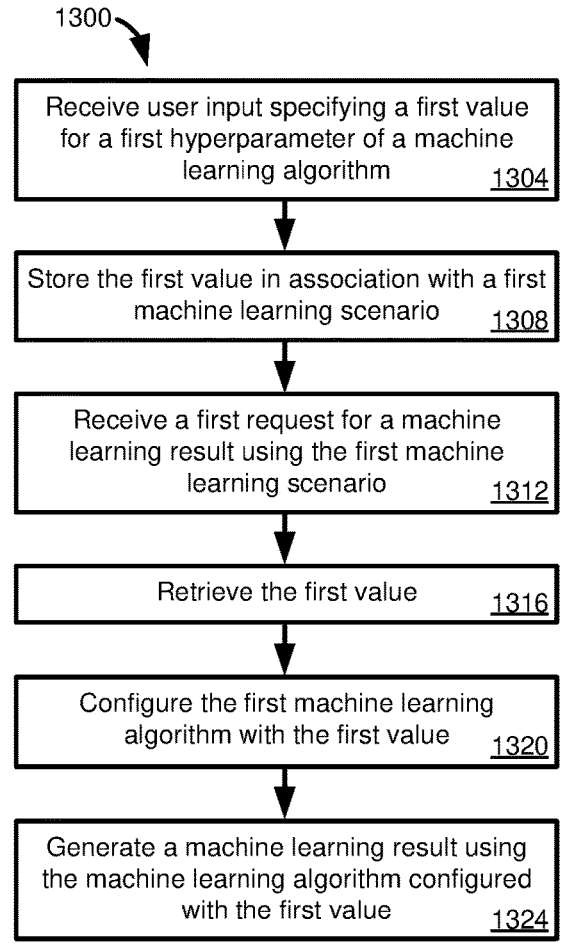
FIG. 13 is a flowchart illustrating an example method of defining a custom hyperparameter for a machine learning model, and use thereof.

FIG. 13 is a flowchart of an example method 1300 for configuring a machine learning model using one or more hyperparameters. The configuration can be carried out for use in training a machine learning model, or can be used in generating a machine learning result using a trained model. The method 1300 can be carried out using the computing architecture 100 of FIG. 1, and can use the machine learning scenario 300 of FIG. 3.

At 1304, user input is received specifying a first value for a first hyperparameter of a machine learning algorithm. The first value is stored at 1308 in association with a first machine learning scenario. At 1312, a first request is received for a machine learning result using the first machine learning scenario. The first value is retrieved at 1316. At 1320, the first machine learning algorithm is configured with the first value. A machine learning result is generated at 1324 using the machine learning algorithm configured with the first value.

Figure 14:
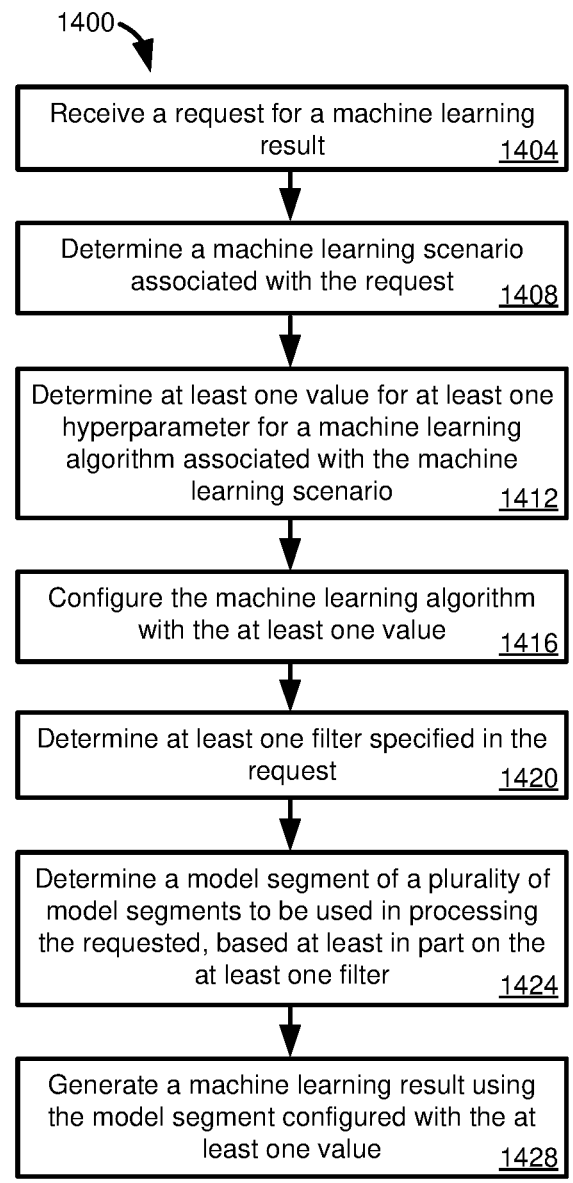
FIG. 14 is a flowchart illustrating an example method of processing a request for a machine learning result using a model segment appropriate for a filter specified in the request and a custom hyperparameter.

FIG. 14 is a flowchart of an example method 1400 for processing a request for a machine learning result. The method 1400 can be carried out in the computing architecture 100 of FIG. 1, and can use the machine learning scenarios 200, 300 of FIGS. 2 and 3. The process 400 shown in FIG. 4 can represent a particular example of at least a portion of the method 1400.

At 1404, a request for a machine learning result is received. A machine learning scenario associated with the request is determined at 1408. At 1412, at least one value is determined for at least one hyperparameter for a machine learning algorithm associated with the machine learning scenario. The machine learning algorithm is configured at 1416 with the at least one value. At 1420, at least one filter value specified in the request is determined. A model segment of a plurality of model segments useable in processing the request is determined at 1424, based at least in part on the at least one filter value. At 1428, a machine learning result is generated using the model segment configured with the at least one filter value.

Example 10—Example Machine Learning Pipeline

Figure 15:
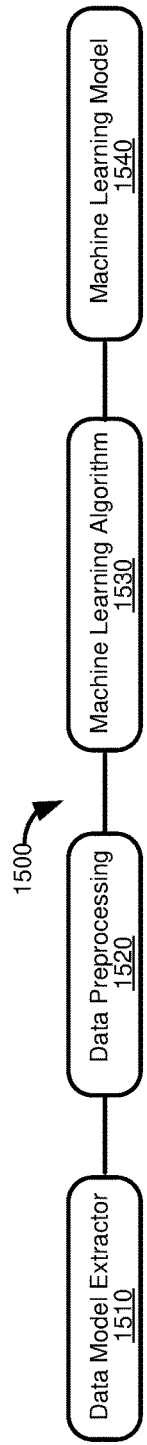
FIG. 15 is an example processing pipeline for a machine learning scenario.

FIG. 15 illustrates an example of operators in a machine learning pipeline 1500 for a machine learning scenario. The machine learning scenario can represent a machine learning scenario of the type configurable using the user interface screens shown in FIGS. 6-11, or a scenario 200, 300 depicted in FIGS. 2 and 3.

The machine learning pipeline 1500 includes a data model extractor operator 1510. The data model extractor operator 1510 can specify artefacts in a virtual data model from which data can be extracted. The data model extractor operator 1510 typically will include path/location information useable to locate the relevant artefacts, such as an identifier for a system on which the virtual data model is located, an identifier for the virtual data model, and identifiers for the relevant artefacts.

The data model extractor operator 1510 can also specify whether data updates are desired and, if so, why type of change data processing should be used, such as whether timestamp/date based change detection should be used (and a particular attribute to be monitored) or whether change data capture should be used, and how often updates are requested. The data model extractor operator 1510 can specify additional parameters, such as a package size that should be used in transferring data to the cloud system (or, more generally, the system to which data is being transferred).

In other cases, the data model extractor operator 1510 can specify unstructured data to be retrieved, including options similar to those used for structured data. For example, the data model extractor operator 1510 can specify particular locations for unstructured data to be transferred, particular file types or metadata properties of unstructured data that is requested, a package size for transfer, and a schedule at which to receive updated data or to otherwise refresh the relevant data (e.g., transferring all of the requested data, rather that specifically identifying changed unstructured data).

Typically, the type of data model extractor operator 1510 is selected based on the nature of a particular machine learning scenario, including the particular algorithm being used. In many cases, machine learning algorithms are configured to use either structured data or unstructured data, at least for a given scenario. However, a given machine learning extraction pipeline can include a data model extractor operator 1510 that requests both structured and unstructured data, or can include multiple data model extractor operators (e.g., an operator for structured data and another operator for unstructured data).

The machine learning pipeline 1500 can further include one or more data preprocessing operators 1520. A data preprocessing operator 1520 can be used to prepare data for use by a machine learning algorithm operator 1530. The data preprocessing operator 1520 can perform actions such as formatting data, labelling data, checking data integrity or suitability (e.g., a minimum number of data points), calculating additional values, or determining parameters to be used with the machine learning algorithm operator 1530.

The machine learning algorithm operator 1530 is a particular machine learning algorithm that is used to process data received and processed in the machine learning pipeline 1500. The machine learning algorithm operator 1530 can include configuration information for particular parameters to be used for a particular scenario of interest, and can include configuration information for particular output that is desired (including data visualization information or other information used to interpret machine learning results).

The machine learning pipeline 1500 includes a machine learning model operator 1540 that represents the machine learning model produced by training the machine learning algorithm associated with the machine learning algorithm operator 1530. The machine learning model operator 1540 represents the actual model that can be used to provide machine learning results.

Typically, once the machine learning pipeline 1500 has been executed such that the operators 1510, 1520, 1530 have completed, a user can call the machine learning model operator 1540 to obtain results for a particular scenario (e.g., a set of input data). Unless it is desired to update or retrain the corresponding algorithm, it is not necessary to execute other operators in the machine learning pipeline 1500, particularly operations associated with the data model extractor operator 1510.

Example 11—Example Machine Learning Scenario Definition

Figure 16:
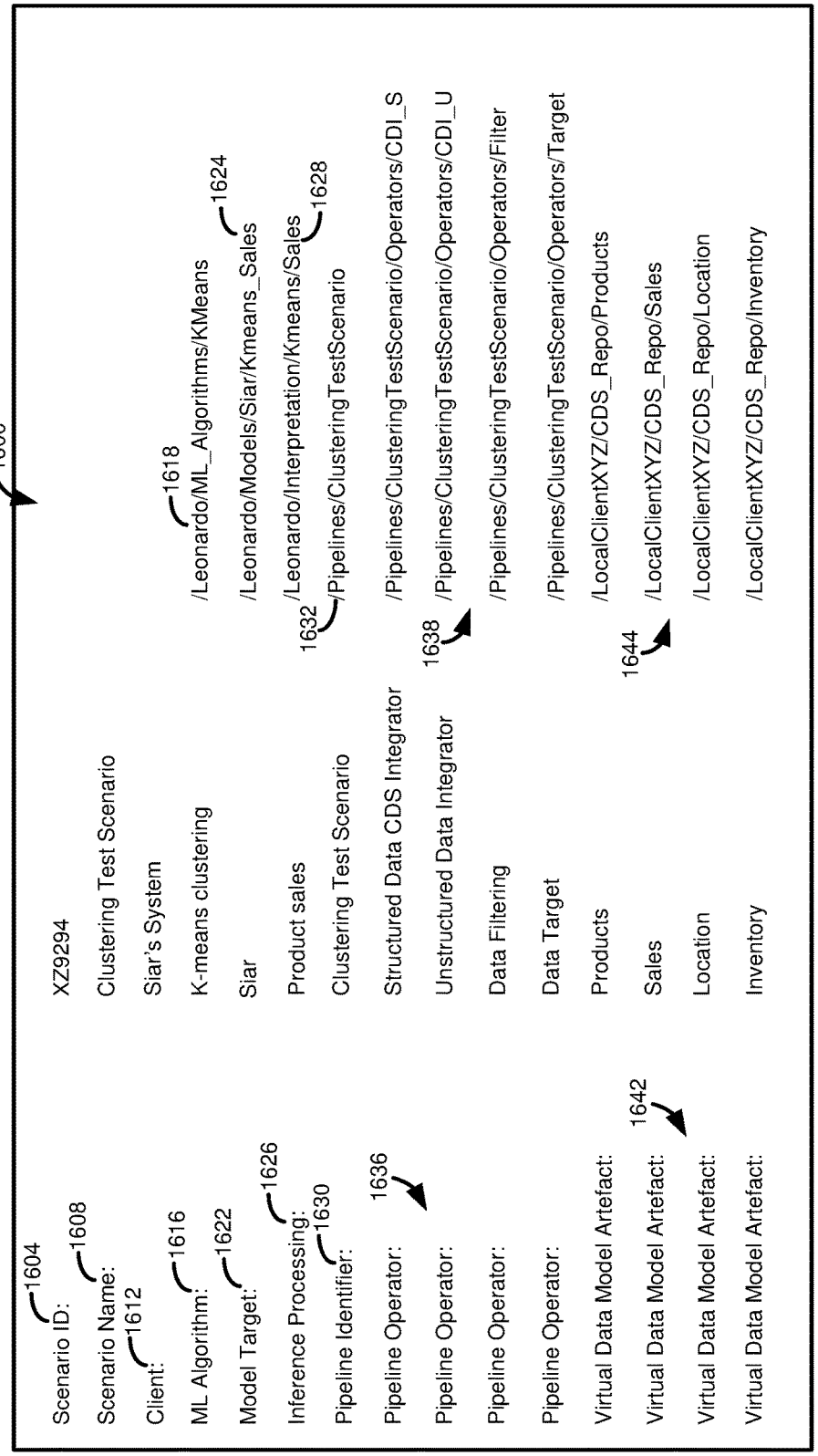
FIG. 16 is an example table of metadata that can be used in an example machine learning scenario that can use disclosed technologies.

FIG. 16 illustrates example metadata 1600 that can be stored as part of a machine learning scenario. The machine learning scenario can represent a machine learning scenario of the type configurable using the user interface screens shown in FIGS. 6-11, or a scenario 200, 300 depicted in FIGS. 2 and 3. Information in a machine learning scenario can be used to execute various aspects of the scenario, such as training a machine learning model (including a model segment) or using the model to process a particular set of input data.

The metadata 1600 can include a scenario ID 1604 useable to uniquely identify a scenario. A more semantically meaningful name 1608 can be associated with a given scenario ID 1604, although the name 1608 may not be constrained to be unique. In some cases, the scenario ID 1604 can be used as the identifier for a particular subscriber to structured or unstructured data. A particular client (e.g., system or end user) 1612 can be included in the metadata 1600.

An identifier 1616 can indicate a particular machine learning algorithm to be used for a given scenario, and can include a location 1618 for where the algorithm can be accessed. A target identifier 1622 can be used to indicate a location 1624 where a trained model should be stored. When the trained model is to be used, results are typically processed to provide particular information (including as part of a visualization) to an end user. Information useable to process results of using a machine learning algorithm for a particular set of input can be specified in a metadata element 1626, including a location 1628.

As discussed in prior Examples, a machine learning scenario can be associated with a particular machine learning pipeline, such as the machine learning pipeline 1500 of FIG. 15. An identifier of the pipeline can be specified by a metadata element 1630, and a location for the pipeline (e.g., a definition of the pipeline) can be specified by a metadata element 1632. Optionally, particular operators in the given machine learning pipeline can be specified by metadata elements 1636, with locations of the operators provided by metadata elements 1638.

In a similar manner, the metadata 1600 can include elements 1642 that specify particular virtual data model artefacts that are included in the machine learning scenario, and elements 1644 that specify a location for the respective virtual data model artefact. In other cases, the metadata 1600 does not include the elements 1642, 1644, and virtual data model artefacts can be obtained using, for example, a definition for a pipeline operator. While not shown, the metadata 1600 could include information for unstructured data used by the machine learning scenario, or such information could be stored in a definition for a pipeline operator associated with unstructured data.

Example 12—Example Relationship Between Elements of a Database Schema

In some cases, data model information can be stored in a data dictionary or similar repository, such as an information schema. An information schema can store information defining an overall data model or schema, tables in the schema, attributes in the tables, and relationships between tables and attributes thereof. However, data model information can include additional types of information, as shown in FIG. 17.

Figure 17:
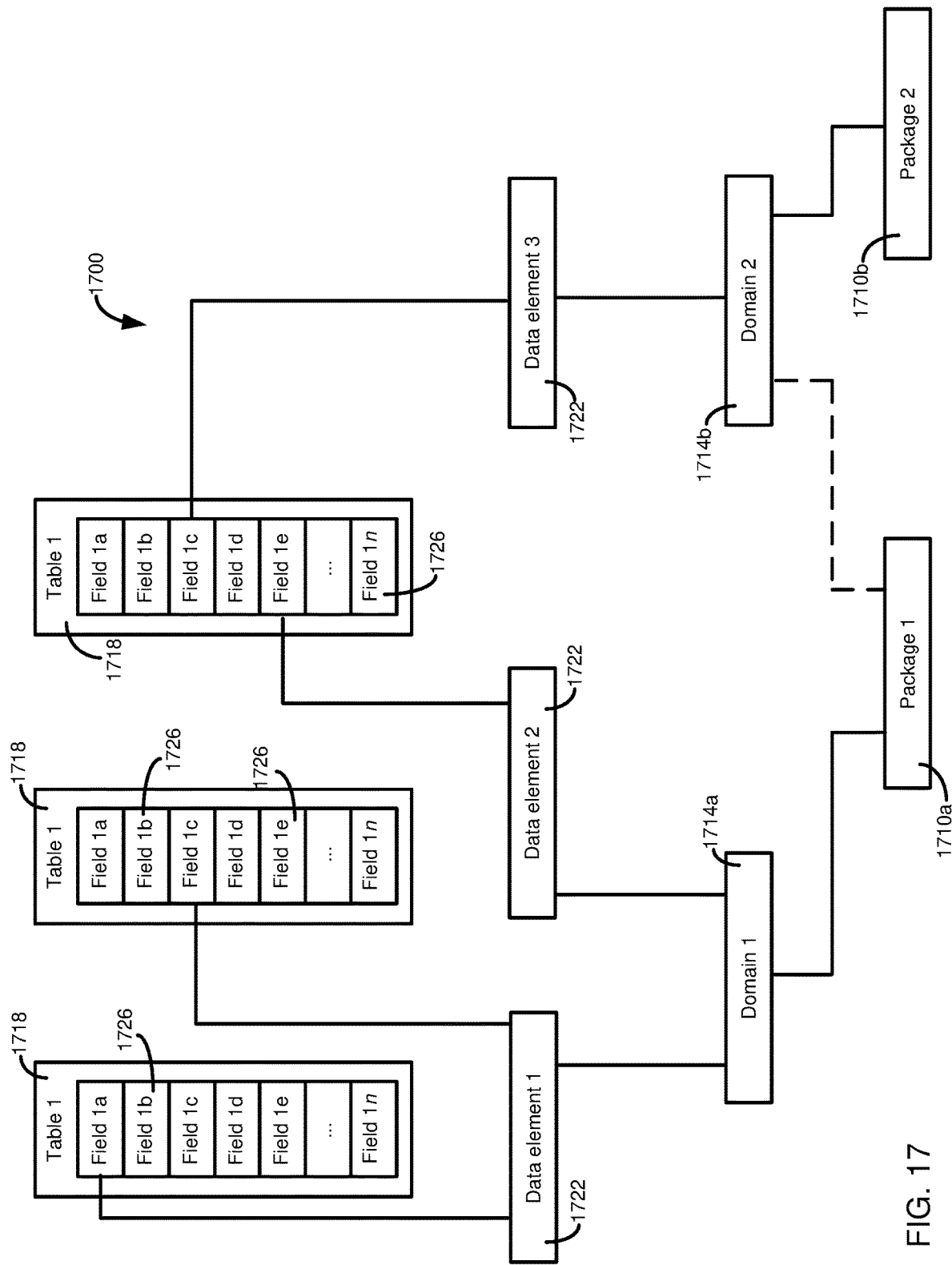
FIG. 17 is a schematic diagram illustrating relationships between table elements that can be included in a data dictionary, or otherwise used to define database tables.

FIG. 17 is a diagram illustrating elements of a database schema 1700 and how they can be interrelated. In at least some cases, the database schema 1700 can be maintained other than at the database layer of a database system. That is, for example, the database schema 1700 can be independent of the underlying database, including a schema used for the underlying database. Typically, the database schema 1700 is mapped to a schema of the database layer, such that records, or portions thereof (e.g., particular values of particular fields) can be retrieved through the database schema 1700.

The database schema 1700 can include one or more packages 1710. A package 1710 can represent an organizational component used to categorize or classify other elements of the schema 1700. For example, the package 1710 can be replicated or deployed to various database systems. The package 1710 can also be used to enforce security restrictions, such as by restricting access of particular users or particular applications to particular schema elements.

A package 1710 can be associated with one or more domains 1714 (i.e., a particular type of semantic identifier or semantic information). In turn, a domain 1714 can be associated with one or more packages 1710. For instance, domain 1, 1714a, is associated only with package 1710a, while domain 2, 1714b, is associated with package 1710a and package 1710b. In at least some cases, a domain 1714 can specify which packages 1710 may use the domain. For instance, it may be that a domain 1714 associated with materials used in a manufacturing process can be used by a process-control application, but not by a human resources application.

In at least some implementations, although multiple packages 1710 can access a domain 1714 (and database objects that incorporate the domain), a domain (and optionally other database objects, such as tables 1718, data elements 1722, and fields 1726, described in more detail below) is primarily assigned to one package. Assigning a domain 1714, and other database objects, to a unique package can help create logical (or semantic) relationships between database objects. In FIG. 17, an assignment of a domain 1714 to a package 1710 is shown as a solid line, while an access permission is shown as a dashed line. So, domain 1714a is assigned to package 1710a, and domain 1714b is assigned to package 1710b. Package 1710a can access domain 1714b, but package 1710b cannot access domain 1714a.

Note that at least certain database objects, such as tables 1718, can include database objects that are associated with multiple packages. For example, a table 1718, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 1714 (that is, the domains can provide further semantic context for database objects that are associated with an object of another package, rather than being assigned to a common package).

As will be explained in more detail, a domain 1714 can represent the most granular unit from which database tables 1718 or other schema elements or objects can be constructed. For instance, a domain 1714 may at least be associated with a datatype. Each domain 1714 is associated with a unique name or identifier, and is typically associated with a description, such as a human readable textual description (or an identifier than can be correlated with a human readable textual description) providing the semantic meaning of the domain. For instance, one domain 1714 can be an integer value representing a phone number, while another domain can be an integer value representing a part number, while yet another integer domain may represent a social security number. The domain 1714 thus can held provide common and consistent use (e.g., semantic meaning) across the schema 1700. That is, for example, whenever a domain representing a social security number is used, the corresponding fields can be recognized as having this meaning even if the fields or data elements have different identifiers or other characteristics for different tables.

The schema 1700 can include one or more data elements 1722. Each data element 1722 is typically associated with a single domain 1714. However, multiple data elements 1722 can be associated with a particular domain 1714. Although not shown, multiple elements of a table 1718 can be associated with the same data element 1722, or can be associated with different data elements having the same domain 1714. Data elements 1722 can serve, among other things, to allow a domain 1714 to be customized for a particular table 1718. Thus, the data elements 1722 can provide additional semantic information for an element of a table 1718.

Tables 1718 include one or more fields 1726, at least a portion of which are mapped to data elements 1722. The fields 1726 can be mapped to a schema of a database layer, or the tables 1718 can be mapped to a database layer in another manner. In any case, in some embodiments, the fields 1726 are mapped to a database layer in some manner Or, a database schema can include semantic information equivalent to elements of the schema 1700, including the domains 1714.

In some embodiments, one or more of the fields 1726 are not mapped to a domain 1714. For example, the fields 1726 can be associated with primitive data components (e.g., primitive datatypes, such as integers, strings, Boolean values, character arrays, etc.), where the primitive data components do not include semantic information. Or, a database system can include one or more tables 1718 that do not include any fields 1726 that are associated with a domain 1714. However, the disclosed technologies include a schema 1700 (which can be separate from, or incorporated into, a database schema) that includes a plurality of tables 1718 having at least one field 1726 that is associated with a domain 1714, directly or through a data element 1722.

Example 13—Example Data Dictionary

Schema information, such as information associated with the schema 1700 of FIG. 17, can be stored in a repository, such as a data dictionary. As discussed, in at least some cases the data dictionary is independent of, but mapped to, an underlying relational database. Such independence can allow the same database schema 1700 to be mapped to different underlying databases (e.g., databases using software from different vendors, or different software versions or products from the same vendor). The data dictionary can be persisted, such as being maintained in a stored tables, and can be maintained in memory, either in whole or part. An in-memory version of a data dictionary can be referred to as a dictionary buffer.

Figure 18:
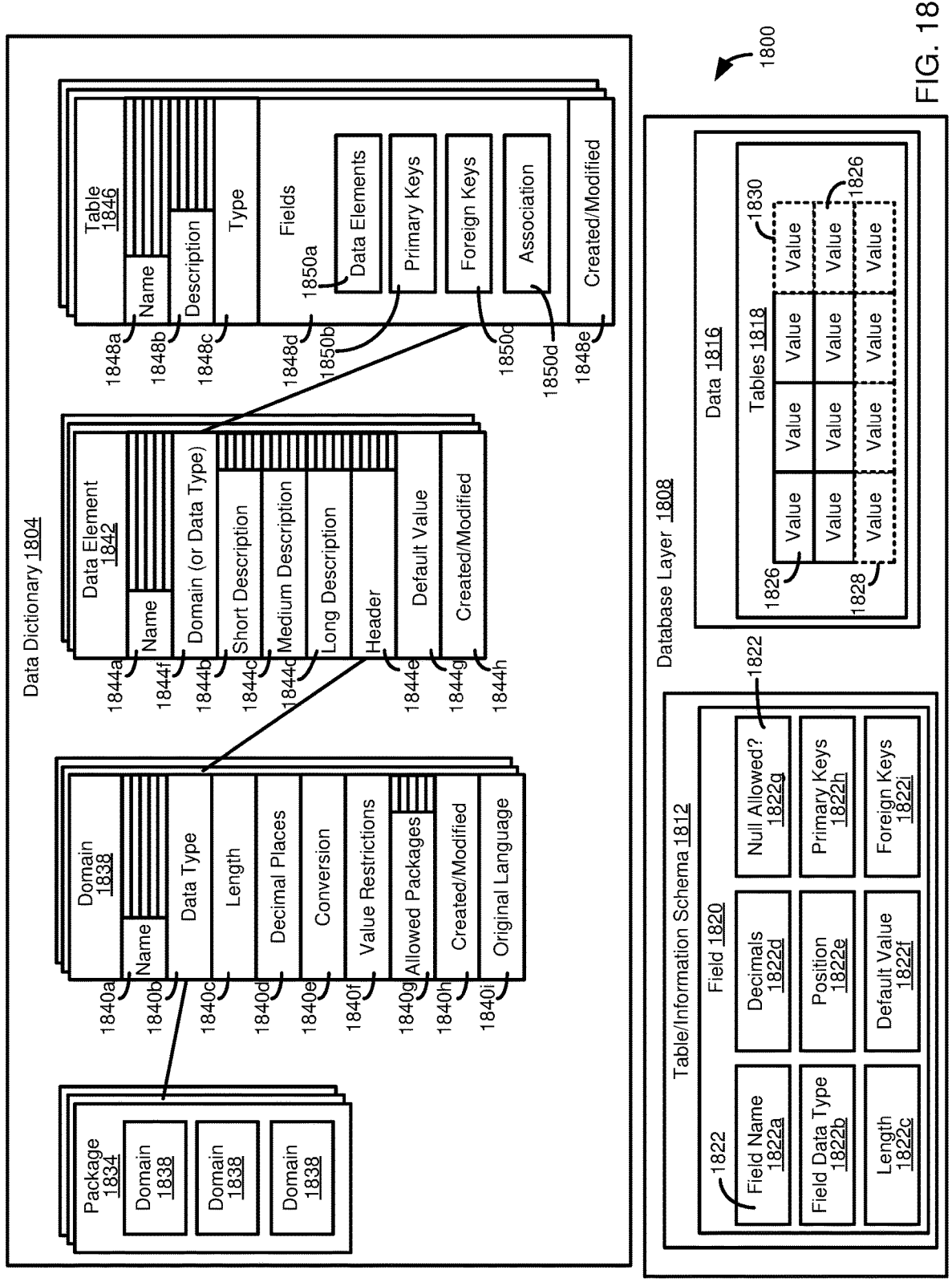
FIG. 18 is a schematic diagram illustrating components of a data dictionary and components of a database layer.

FIG. 18 illustrates a database environment 1800 having a data dictionary 1804 that can access, such as through a mapping, a database layer 1808. The database layer 1808 can include a schema 1812 (e.g., an INFORMATION_SCHEMA as in PostgreSQL) and data 1816, such as data associated with tables 1818. The schema 1812 includes various technical data items/components 1822, which can be associated with a field 1820, such as a field name 1822a (which may or may not correspond to a readily human-understandable description of the purpose of the field, or otherwise explicitly describe the semantic meaning of values for that field), a field data type 1822b (e.g., integer, varchar, string, Boolean), a length 1822c (e.g., the size of a number, the length of a string, etc., allowed for values in the field), a number of decimal places 1822d (optionally, for suitable datatypes, such as, for a float with length 6, specifying whether the values represent XX.XXXX or XXX.XXX), a position 1822e (e.g., a position in the table where the field should be displayed, such as being the first displayed field, the second displayed field, etc.), optionally, a default value 1822f (e.g., "NULL," "0," or some other value), a NULL flag 1822g indicating whether NULL values are allowed for the field, a primary key flag 1822h indicating whether the field is, or is used in, a primary key for the table, and a foreign key element 1822i, which can indicate whether the field 1820 is associated with a primary key of another table, and, optionally, an identifier of the table/field referenced by the foreign key element. A particular schema 1812 can include more, fewer, or different technical data items 1822 than shown in FIG. 18.

The tables 1818 are associated with one or more values 1826. The values 1826 are typically associated with a field 1820 defined using one or more of the technical data elements 1822. That is, each row 1828 typically represents a unique tuple or record, and each column 1830 is typically associated with a definition of a particular field 1820. A table 1818 typically is defined as a collection of the fields 1820, and is given a unique identifier.

The data dictionary 1804 includes one or more packages 1834, one or more domains 1838, one or more data elements 1842, and one or more tables 1846, which can at least generally correspond to the similarly titled components 1710, 1714, 1722, 1718, respectively, of FIG. 17. As explained in the discussion of FIG. 17, a package 1834 includes one or more (typically a plurality) of domains 1838. Each domain 1838 is defined by a plurality of domain elements 1840. The domain elements 1840 can include one or more names 1840*a*. The names 1840*a* serve to identify, in some cases uniquely, a particular domain 1838. A domain 1838 includes at least one unique name 1840*a*, and may include one or more names that may or may not be unique. Names which may or may not be unique can include versions of a name, or a description, of the domain 1838 at various lengths or levels of detail. For instance, names 1840*a* can include text that can be used as a label for the domain 1838, and can include short, medium, and long versions, as well as text that can be specified as a heading. Or, the names 1840*a* can include a primary name or identifier and a short description or field label that provides human understandable semantics for the domain 1838.

In at least some cases, the data dictionary 1804 can store at least a portion of the names 1840*a* in multiple languages, such as having domain labels available for multiple languages. In embodiments of the disclosed technologies, when domain information is used for identifying relationships between tables or other database elements or objects, including searching for particular values, information, such as names 1840*a*, in multiple languages can be searched. For instance, if "customer" is specified, the German and French portion of the names 1840*a* can be searched as well as an English version.

The domain elements 1840 can also include information that is at least similar to information that can be included in the schema 1812. For example, the domain elements 1840 can include a data type 1840*b*, a length 1840*c*, and a number of decimal places 1840*d* associated with relevant data types, which can correspond to the technical data elements 1822*b*, 1822*c*, 1822*d*, respectively. The domain elements 1840 can include conversion information 1840*e*. The conversion information 1840*e* can be used to convert (or interconvert) values entered for the domain 1838 (including, optionally, as modified by a data element 1842). For instance, conversion information 1840 can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 1838 can be stored in a repository, such as a field catalog.

The domain elements 1840 can include one or more value restrictions 1840*f*. A value restriction 1840*f* can specify, for example, that negative values are or are not allowed, or particular ranges or threshold of values that are acceptable for a domain 1838. In some cases, an error message or similar indication can be provided as a value is attempted to be used with a domain 1838 that does not comply with a value restriction 1840*f*. A domain element 1840*g* can specify one or more packages 1834 that are allowed to use the domain 1838.

A domain element 1840*h* can specify metadata that records creation or modification events associated with a domain element 1838. For instance, the domain element 1840*h* can record the identity of a user or application that last modified the domain element 1840*h*, and a time that the modification occurred. In some cases, the domain element 1840*h* stores a larger history, including a complete history, of creation and modification of a domain 1838.

A domain element 1840*i* can specify an original language associated with a domain 1838, including the names 1840*a*. The domain element 1840*i* can be useful, for example, when it is to be determined whether the names 1840*a* should be converted to another language, or how such conversion should be accomplished.

Data elements 1842 can include data element fields 1844, at least some of which can be at least generally similar to domain elements 1840. For example, a data element field 1844*a* can correspond to at least a portion of the name domain element 1840*a*, such as being (or including) a unique identifier of a particular data element 1842. The field label information described with respect to the name domain element 1840*a* is shown as separated into a short description label 1844*b*, a medium description label 1844*c*, a long description label 1844*d*, and a header description 1844*e*. As described for the name domain element 1840*a*, the labels and header 1844*b*-1844*e* can be maintained in one language or in multiple languages.

A data element field 1844*f* can specify a domain 1838 that is used with the data element 1842, thus incorporating the features of the domain elements 1840 into the data element. Data element field 1844*g* can represent a default value for the data element 1842, and can be at least analogous to the default value 1822*f* of the schema 1812. A created/modified data element field 1844*h* can be at least generally similar to the domain element 1840*h*.

Tables 1846 can include one or more table elements 1848. At least a portion of the table elements 1848 can be at least similar to domain elements 1840, such as table element 1848*a* being at least generally similar to domain element 1840*a*, or data element field 1844*a*. A description table element 1848*b* can be analogous to the description and header labels described in conjunction with the domain element 1840*a*, or the labels and header data element fields 1844*b*-1844*e*. A table 1846 can be associated with a type using table element 1848*c*. Example table types include transparent tables, cluster tables, and pooled tables, such as used as in database products available from SAP SE of Walldorf, Germany.

Tables 1846 can include one or more field table elements 1848*d*. A field table element 1848*d* can define a particular field of a particular database table. Each field table element 1848*d* can include an identifier 1850*a* of a particular data element 1842 used for the field. Identifiers 1850*b*-1850*d*, can specify whether the field is, or is part of, a primary key for the table (identifier 1850*b*), or has a relationship with one or more fields of another database table, such as being a foreign key (identifier 1850*c*) or an association (identifier 1850*d*).

A created/modified table element 1848*e* can be at least generally similar to the domain element 1840*h*.

Example 14—Computing Systems

Figure 19:
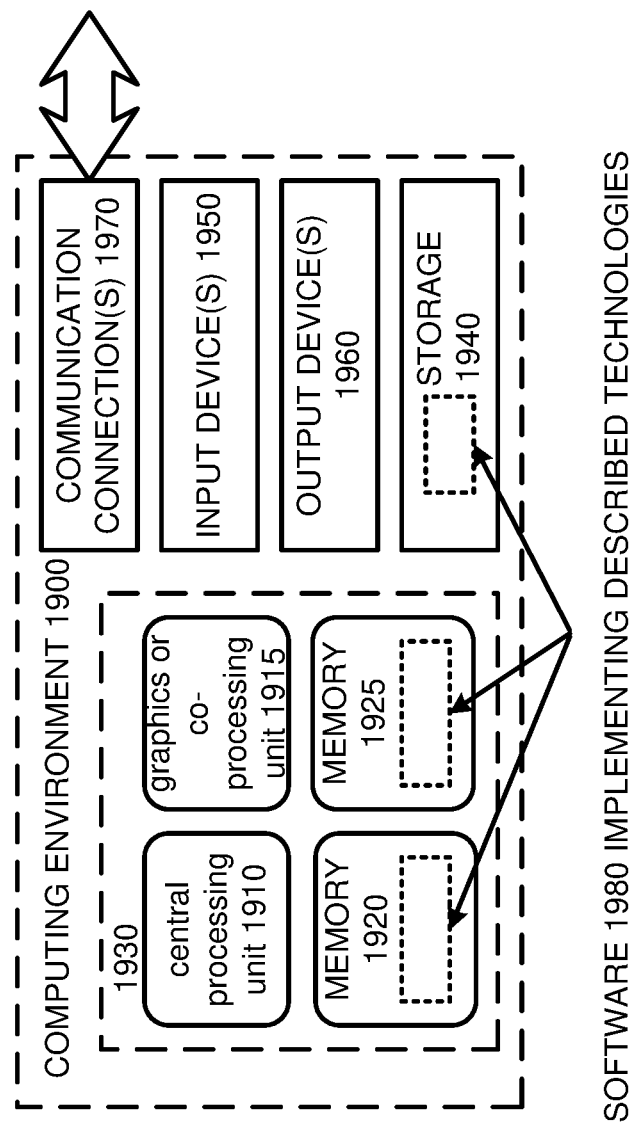
FIG. 19 is a diagram of an example computing system in which some described embodiments can be implemented.

FIG. 19 depicts a generalized example of a suitable computing system 1900 in which the described innovations may be implemented. The computing system 1900 is not intended to suggest any limitation as to scope of use or functionality of the present disclosure, as the innovations may be implemented in diverse general-purpose or special-purpose computing systems.

With reference to FIG. 19, the computing system 1900 includes one or more processing units 1910, 1915 and memory 1920, 1925. In FIG. 19, this basic configuration 1930 is included within a dashed line. The processing units 1910, 1915 execute computer-executable instructions, such as for implementing technologies described in any of Examples 1-13 A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 19 shows a central processing unit 1910 as well as a graphics processing unit or co-processing unit 1915. The tangible memory 1920, 1925 may be volatile memory (e.g., registers, cache, RAM), non-volatile memory (e.g., ROM, EEPROM, flash memory, etc.), or some combination of the two, accessible by the processing unit(s) 1910, 1915. The memory 1920, 1925 stores software 1980 implementing one or more innovations described herein, in the form of computer-executable instructions suitable for execution by the processing unit(s) 1910, 1915.

A computing system 1900 may have additional features. For example, the computing system 1900 includes storage 1940, one or more input devices 1950, one or more output devices 1960, and one or more communication connections 1970. An interconnection mechanism (not shown) such as a bus, controller, or network interconnects the components of the computing system 1900. Typically, operating system software (not shown) provides an operating environment for other software executing in the computing system 1900, and coordinates activities of the components of the computing system 1900.

The tangible storage 1940 may be removable or non-removable, and includes magnetic disks, magnetic tapes or cassettes, CD-ROMs, DVDs, or any other medium which can be used to store information in a non-transitory way and which can be accessed within the computing system 1900. The storage 1940 stores instructions for the software 1980 implementing one or more innovations described herein.

The input device(s) 1950 may be a touch input device such as a keyboard, mouse, pen, or trackball, a voice input device, a scanning device, or another device that provides input to the computing system 1900. The output device(s) 1960 may be a display, printer, speaker, CD-writer, or another device that provides output from the computing system 1900.

The communication connection(s) 1970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Cloud Computing Environment

Figure 20:
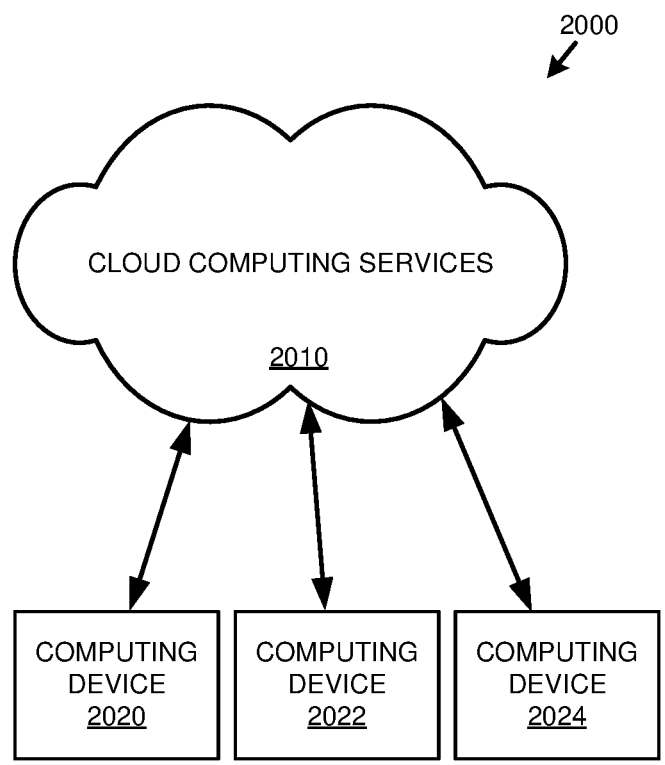
FIG. 20 is an example cloud computing environment that can be used in conjunction with the technologies described herein.

FIG. 20 depicts an example cloud computing environment 2000 in which the described technologies can be implemented, such as a cloud system 114 of FIG. 1. The cloud computing environment 2000 comprises cloud computing services 2010. The cloud computing services 2010 can comprise various types of cloud computing resources, such as computer servers, data storage repositories, networking resources, etc. The cloud computing services 2010 can be centrally located (e.g., provided by a data center of a business or organization) or distributed (e.g., provided by various computing resources located at different locations, such as different data centers and/or located in different cities or countries).

The cloud computing services 2010 are utilized by various types of computing devices (e.g., client computing devices), such as computing devices 2020, 2022, and 2024. For example, the computing devices (e.g., 2020, 2022, and 2024) can be computers (e.g., desktop or laptop computers), mobile devices (e.g., tablet computers or smart phones), or other types of computing devices. For example, the computing devices (e.g., 2020, 2022, and 2024) can utilize the cloud computing services 2010 to perform computing operators (e.g., data processing, data storage, and the like). The computing devices 2020, 2022, 2024 can correspond to the local system 110 FIG. 1, or can represent a client device, such as a client 116, 118.

Example 16—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 19, computer-readable storage media include memory 1920 and 1925, and storage 1940. The term computer-readable storage media does not include signals and carrier waves. In addition, the term computer-readable storage media does not include communication connections (e.g., 1970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
   receiving a request for a machine learning result;
   determining a machine learning scenario associated with the request;
   determining at least one value for at least one hyperparameter for a machine learning algorithm associated with the machine learning scenario;
   configuring the machine learning algorithm with the at least one value;
   determining at least one filter value specified in the request;
   determining a model segment of a plurality of model segments to be used in processing the request, based at least in part on the at least one filter value; and
   generating a machine learning result using the model segment configured with the at least one filter value.

2. The computing system of claim 1, the operations further comprising:
   determining that the model segment should be retrained; and
   retraining the model segment.

3. The computing system of claim 2, wherein the determining that the model segment should be retrained is based on a schedule.

4. The computing system of claim 1, the operations further comprising:
   determining at least one configuration setting associated with the machine learning scenario; and
   applying the at least one configuration setting to the machine learning model.

5. The computing system of claim 4, wherein the generating a machine learning result is carried out by a first computing system, the operations further comprising:
   receiving the at least one configuration setting from a second computing system.

6. The computing system of claim 1, the operations further comprising:
   receiving user input specifying the at least one value for the at least one hyperparameter; and
   storing the at least one value in association with the machine learning scenario.

7. The computing system of claim 6, the operations further comprising:
receiving a second request for a machine learning result using a second machine learning scenario;
determining that a value for the at least one hyperparameter was not specified for the second machine learning scenario;
configuring the machine learning algorithm with a default value for the at least one hyperparameter; and
generating a second machine learning result using the machine learning algorithm configured with the default second value.

8. A method, implemented in a computing system comprising at least one hardware processor and at least one memory coupled to the at least one hardware processor, the method comprising:
receiving a request for a machine learning result;
determining a machine learning scenario associated with the request;
determining at least one value for at least one hyperparameter for a machine learning algorithm associated with the machine learning scenario;
configuring the machine learning algorithm with the at least one value;
determining at least one filter value specified in the request;
determining a model segment of a plurality of model segments to be used in processing the request, based at least in part on the at least one filter value; and
generating a machine learning result using the model segment configured with the at least one filter value.

9. The method of claim 8, further comprising:
determining that the model segment should be retrained; and
retraining the model segment.

10. The method of claim 9, wherein the determining that the model segment should be retrained is based on a schedule.

11. The method of claim 8, further comprising:
determining at least one configuration setting associated with the machine learning scenario; and
applying the at least one configuration setting to the machine learning model.

12. The method of claim 11, wherein the generating a machine learning result is carried out by a first computing system, the method further comprising:
receiving the at least one configuration setting from a second computing system.

13. The method of claim 8, further comprising:
receiving user input specifying the at least one value for the at least one hyperparameter; and
storing the at least one value in association with the machine learning scenario.

14. The method of claim 13, further comprising:
receiving a second request for a machine learning result using a second machine learning scenario;
determining that a value for the at least one hyperparameter was not specified for the second machine learning scenario;
configuring the machine learning algorithm with a default value for the at least one hyperparameter; and
generating a second machine learning result using the machine learning algorithm configured with the default value.

15. One or more computer-readable storage media comprising:
computer-executable instructions that, when executed by a computing system comprising at least one hardware processor and at least one memory coupled to the at least one hardware processor, cause the computing system to receive a request for a machine learning result;
computer-executable instructions that, when executed by the computing system, cause the computing system to determine a machine learning scenario associated with the request;
computer-executable instructions that, when executed by the computing system, cause the computing system to determine at least one value for at least one hyperparameter for a machine learning algorithm associated with the machine learning scenario;
computer-executable instructions that, when executed by the computing system, cause the computing system to configure the machine learning algorithm with the at least one value;
computer-executable instructions that, when executed, cause a computing device to determine at least one filter value specified in the request;
computer-executable instructions that, when executed by the computing system, cause the computing system to determine a model segment of a plurality of model segments to be used in processing the request, based at least in part on the at least one filter value; and
computer-executable instructions that, when executed by the computing system, cause the computing system to generate a machine learning result using the model segment configured with the at least one filter value.

16. The one or more computer-readable storage media of claim 15, further comprising:
computer-executable instructions that, when executed by the computing system, cause the computing system to determine that the model segment should be retrained; and
computer-executable instructions that, when executed by the computing system, cause the computing system to retrain the model segment.

17. The one or more computer-readable storage media of claim 16, wherein the determining that the model segment should be retrained is based on a schedule.

18. The one or more computer-readable storage media of claim 15, further comprising:
computer-executable instructions that, when executed by the computing system, cause the computing system to determine at least one configuration setting associated with the machine learning scenario; and
computer-executable instructions that, when executed by the computing system, cause the computing system to apply the at least one configuration setting to the machine learning model.

19. The one or more computer-readable storage media of claim 18, wherein the generating a machine learning result is carried out by a first computing system, the one or more computer-readable storage media further comprising:
computer-executable instructions that, when executed by the computing system, cause the computing system to receive the at least one configuration setting from a second computing system.

20. The one or more computer-readable storage media of claim 15, further comprising:
computer-executable instructions that, when executed by the computing system, cause the computing system to receive user input specifying the at least one value for the at least one hyperparameter; and computer-executable instructions that, when executed by the computing system, cause the computing system to store the at least one value in association with the machine learning scenario.

\* \* \* \* \*